(12) United States Patent
Hasegawa et al.

(10) Patent No.: US 12,728,405 B2
(45) Date of Patent: Sep. 8, 2026

(54) POROUS ALUMINA AND CATALYST

(71) Applicants: Renaissance Energy Research Corporation, Kyoto (JP); NATIONAL INSTITUTE OF TECHNOLOGY, Tokyo (JP)

(72) Inventors: Akira Hasegawa, Aomori (JP); Yoshihiro Kadoma, Aomori (JP); Osamu Okada, Kyoto (JP); Kana Motomura, Kyoto (JP); Shizuka Ogasawara, Kyoto (JP); Hiromi Nakamura, Kyoto (JP); Tamotsu Nonouchi, Kyoto (JP); Kaori Matsuda, Kyoto (JP)

(73) Assignees: Renaissance Energy Research Corporation, Kyoto (JP); NATIONAL INSTITUTE OF TECHNOLOGY, Tokyo (JP)

( * ) Notice: Subject to any disclaimer, the term of this patent is extended or adjusted under 35 U.S.C. 154(b) by 761 days.

(21) Appl. No.: 17/909,296

(22) PCT Filed: Feb. 18, 2021

(86) PCT No.: PCT/JP2021/006087

§ 371 (c)(1),
(2) Date: Sep. 2, 2022

(87) PCT Pub. No.: WO2021/192752

PCT Pub. Date: Sep. 30, 2021

(65) Prior Publication Data

US 2023/0105883 A1 Apr. 6, 2023

(30) Foreign Application Priority Data

Mar. 26, 2020 (JP) ................................ 2020-056175

(51) Int. Cl.
*B01J 23/02* (2006.01)

(52) U.S. Cl.
CPC .................................... *B01J 23/02* (2013.01)

(58) Field of Classification Search
CPC . B01J 23/02; B01J 23/002; B01J 23/83; B01J 23/78; B01J 37/033; B01J 37/04;
(Continued)

(56) References Cited

U.S. PATENT DOCUMENTS 3,271,325 A 9/1966 Davies et al.
5,916,839 A 6/1999 Pak et al.
(Continued)

FOREIGN PATENT DOCUMENTS

CN 106955694 A 7/2017
CN 107413389 A 12/2017
(Continued)

OTHER PUBLICATIONS

JP63119851—English Translation (Year: 1986).*
(Continued)

*Primary Examiner* — Christina A Johnson
(74) *Attorney, Agent, or Firm* — Haynes Beffel & Wolfeld LLP; Andrew L. Dunlap; Hannah W. Powell

(57) ABSTRACT

Porous alumina having excellent heat resistance and coking resistance is provided. The porous alumina can include silica and barium oxide added to aluminum oxide, wherein a ratio of SiO2 addition amount to a total mass of aluminum oxide and SiO2 addition amount is defined as SiO2 addition ratio (mass %), a ratio of BaO addition amount to a total mass of aluminum oxide and SiO2 addition amount is defined as BaO addition ratio (mass %), when the SiO2 addition ratio is within a range of 3 mass % or less and the BaO addition ratio is within a range of 14 mass % or less, the silica and the barium oxide are respectively added to the aluminum oxide so that a specific surface area of the porous alumina measured by a measuring method after heat treatment is
(Continued)

equal to or larger than a reference specific surface area of reference porous alumina.

10 Claims, 16 Drawing Sheets

(58) Field of Classification Search
CPC ...... B01J 37/088; B01J 37/18; B01J 37/0207; B01J 37/0201; B01J 35/737; B01J 35/615; B01J 21/12; B01J 2523/00; B01J 2235/15; C01P 2006/12; Y02P 20/52; C01F 7/02
USPC .......................................................... 502/250
See application file for complete search history.

(56) References Cited

U.S. PATENT DOCUMENTS

| | | | | |
|---|---|---|---|---|
| 2013/0324392 | A1 | 12/2013 | Hasegawa et al. | |
| 2014/0329669 | A1 | 11/2014 | Fujimura et al. | |
| 2015/0239746 | A1 | 8/2015 | Yuan et al. | |
| 2015/0336083 | A1 * | 11/2015 | Hasegawa | B01J 37/088 502/263 |

FOREIGN PATENT DOCUMENTS

| | | | | |
|---|---|---|---|---|
| JP | S57171436 | | | 10/1982 |
| JP | 63119851 | A | * | 5/1988 |
| JP | S63119851 | A | | 5/1988 |
| JP | S63242917 | A | | 10/1988 |
| JP | 2004203654 | A | | 7/2004 |
| JP | 2009061383 | A | | 3/2009 |
| WO | 2012096386 | A1 | | 7/2012 |
| WO | 2013111457 | A1 | | 8/2013 |
| WO | 2014051091 | A1 | | 4/2014 |

OTHER PUBLICATIONS

Mohapatra, et.al. ("Effect of barium to aluminium ratio on phases leading to barium aluminates", Ceramics International 33 (2007) 531-535) (Year: 2007).*

"The ACS Style Guide", American Chemical Society, Oxford University Press, 2006, p. 218 (Year: 2006).*

Lee, et al., "Deactivation by coke deposition on the HZSM-5 catalysts in the methanol-to-hydrocarbon conversion", Journal of Physics and Chemistry of Solids 73 (Dec. 2012) 1542-1545.

Numaguchi, et al., "Evaluation of the Activity and Carbon Deposition of Methane Steam Reforming Catalysts", Journal f the Japan Petroleum Institute, vol. 39, No. 3,, May 1, 1996, pp. 203-210; Japanese language with partial Englist ranslation (9 pages total).

* cited by examiner (A) Before heat treatment (B) 1200°C5h (C) 1200°C30h

1200°C30h Specific surface area ($m^2/g$)

| | BaO Addition ratio Xb (mass%) | | | | | | | | | | | | |
|---|---|---|---|---|---|---|---|---|---|---|---|---|---|
| $SiO_2$ Addition ratio Xs (mass%) | 0 | 0.5 | 1 | 3 | 5 | 7 | 10 | 14 | 18 | 20 | 43 | 70 | 100 |
| 0 | 0.2 | 4 | 7 | 4 | 6 | 4 | 10 | 7 | 7 | 5 | 4 | | 0.2 |
| 0.1 | 6 | 10 | | 10 | 11 | 13 | 11 | 10 | 7 | 8 | | | 0.2 |
| 0.3 | 10 | | | | 19 | | 18 | 12 | 9 | | | | |
| 0.5 | 10 | 10 | 14 | 17 | 16 | 16 | 22 | 15 | 12 | 11 | | | 0.2 |
| 0.7 | | | | 25 | **29** | **29** | **30** | 23 | | | | | |
| 1 | 12 | | 15 | **31** | **41** | **34** | **29** | 26 | 21 | 20 | 0.2 | 0.2 | 0.2 |
| 2 | 20 | 23 | **29** | **41** | **48** | **44** | **38** | **34** | 23 | | | | |
| 3 | **29** | **36** | **39** | **50** | **49** | **46** | **45** | **35** | 25 | 16 | 4 | 0.2 | 0.2 |
| 4 | 35 | | | | | 37 | 39 | 36 | 26 | | | | |
| 5 | 36 | 56 | 54 | 56 | 46 | 35 | 29 | 30 | 13 | 16 | | | |
| 7 | 45 | | | 50 | 41 | 26 | 20 | 15 | 7 | | | | |
| 8 | | | | 37 | | 20 | | | | | | | |
| 9 | 59 | | | | 27 | | | | | | | | |
| 10 | 62 | | | 14 | 13 | 11 | 3 | 7 | 2 | 3 | | | 0.2 |
| 30 | 15 | | | | | | | | | | | | 0.2 |

Fig. 11

1200℃30h Specific surface area ($m^2/g$)

| | BaO Addition ratio Xb (mass%) | | | | | | |
|---|---|---|---|---|---|---|---|
| $SiO_2$ Addition ratio Xs (mass%) | 0 | 1 | 3 | 5 | 7 | 10 | 14 |
| 0 | 4 | | | | | | |
| 0.7 | | | | **58** | **60** | **54** | |
| 1 | 7 | 32 | **53** | **70** | **76** | **68** | |
| 2 | | **58** | **63** | **69** | **73** | **60** | **57** |
| 3 | 48 | **62** | **79** | **73** | **81** | **79** | **56** |

Fig. 14

POROUS ALUMINA AND CATALYST

TECHNICAL FIELD

The present invention relates to porous alumina including silica and a solid basic oxide added to aluminum oxide, and a catalyst using porous alumina as a catalyst support, and more particularly, to porous alumina and a catalyst with barium oxide added as the solid basic oxide.

BACKGROUND ART

Porous alumina materials having a large specific surface area such as γ-alumina are useful as a catalyst support, on which a catalytic substance is supported, a filter or the like. Studies for improving the characteristics of such materials have been conducted on an ongoing basis (see, for example, Patent Documents 1 to 5, and the like).

PRIOR ART DOCUMENTS

Patent Documents

PATENT DOCUMENT 1: JP2004-203654 A
PATENT DOCUMENT 2: WO2014/051091 A1
PATENT DOCUMENT 3: WO2012/096386 A1
PATENT DOCUMENT 4: WO2013/111457 A1
PATENT DOCUMENT 5: JP2009-061383 A

Non-Patent Documents

NON-PATENT DOCUMENT 1: Toru Numaguchi, et al., "Evaluation of the Activity and Carbon Deposition of Methane Steam Reforming Catalysts," Journal of the Japan Petroleum Institute, Vol. 39, No. 3, 1996.
NON-PATENT DOCUMENT 2: Ki-Yong Lee, et al., "Deactivation by coke deposition on the HZSM-5 catalysts in the methanol-to-hydrocarbon conversion", Journal of Physics and Chemistry of Solids 73 (2012) 1542-1545.

SUMMARY OF THE INVENTION

Problems to be Solved by the Invention

However, conventional porous alumina materials having a large specific surface area such as γ-alumina or the like undergo easily transition to the α phase, very quickly at high temperatures of 1000° C. or higher, but also at lower temperatures over long periods of time and have the specific surface area thereof remarkably lowered. The transition to the α phase tends to be more pronounced in a water vapor atmosphere or under high pressure.

In order to suppress the transition to the α phase, when a solid acidic additive such as silica ($SiO_2$) is used, heat resistance is greatly improved, and a large specific surface area can be maintained even at high temperatures, but the solid acidity of the porous alumina material increases. Therefore, when a porous alumina material containing a solid acidic additive is used as a catalyst support, in reactions for hydrocarbons, carbon deposition (coking) tends to occur on the surface of the catalyst, which causes catalyst deactivation. Therefore, a catalyst support used in reactions using a hydrocarbon such as a steam reforming reaction is required to have not only heat resistance but also coking resistance. It is well known that, coking tends to occur when the solid acidity of the porous support increases, as disclosed in the above-mentioned Non-Patent Documents 1 and 2.

FIG. 1 shows the relationship between $SiO_2$ addition ratio and a specific surface area of porous alumina to which only silica is added prepared by the same kneading method as the comparative samples described later. Respective specific surface areas of samples A, B and C were measured by nitrogen adsorption BET method, where the sample A was obtained by calcination at 1000° C. for 5 hours in air, the sample B was obtained by adding heat treatment at 1200° C. for 5 hours to the sample A, and the sample C was obtained by adding heat treatment at 1200° C. for 30 hours to the sample A. As shown in FIG. 1, the specific surface area after the heat treatment is greatly improved as $SiO_2$ addition ratio is increased, and it is obvious that silica is effective for improving the heat resistance of porous alumina.

FIG. 2 shows the results of measuring the solid acid amount and the solid base amount on porous alumina surface of the sample A by the temperature-programed desorption method (TPD, base probe molecule: $NH_3$, acid probe molecule: $CO_2$). As $SiO_2$ addition ratio increases, $NH_3$ adsorption increases and $CO_2$ adsorption decreases, and it is understood that the solid acid amount increases and the solid base amount decreases on the porous alumina surface.

The acid and base points on the solid surface coexist because they are difficult to neutralize. Since silica, alumina, and mixed oxides thereof are also solid acids and solid bases, both the solid acid amount and the solid base amount have been measured without being neutralized at the solid surface, as shown in FIG. 2.

It is understood from FIGS. 1 and 2 that by only adding silica of solid acidity, it is difficult to achieve both improvement in heat resistance of γ-alumina and suppression of increase in solid acidity (coking resistance) Further, methods of adding barium, lanthanum, or the like to alumina for the purpose of improving heat resistance has also been reported, but none of them can be said to have sufficient heat resistance (see Patent Documents 4 and 5).

In view of the above problems, it is an object of the present invention to provide porous alumina having excellent heat resistance and coking resistance, and further to provide a catalyst using the porous alumina as a catalyst support.

Means for Solving the Problem

As a result of diligent research, the inventor of the present application has found that porous alumina having superior heat resistance and coking resistance than porous alumina to which only silica is added can be obtained by combining silica and barium oxide which is a solid basic oxide as additives to be added to porous alumina having a large specific surface area such as γ-alumina, and appropriately adjusting each addition amount of silica and barium oxide, and has reached the invention described below.

As the first feature of the present invention, it is characterized by being porous alumina including silica ($SiO_2$) and barium oxide (BaO) added to aluminum oxide ($Al_2O_3$), wherein

- a ratio of $SiO_2$ addition amount to a total mass of the aluminum oxide and the $SiO_2$ addition amount is defined as $SiO_2$ addition ratio (mass %),
- a ratio of BaO addition amount to a total mass of the aluminum oxide and the $SiO_2$ addition amount is defined as BaO addition ratio (mass %), the $SiO_2$ addition amount is an amount obtained by converting a content of silicon (Si) in the porous alumina into a content of $SiO_2$, the BaO addition amount is an amount obtained by converting a content of barium (Ba) in the porous alumina into a content of BaO, the $SiO_2$ addition ratio is within a range of 3 mass % or less and the BaO addition ratio is within a range of 14 mass % or less, and the silica and the barium oxide are respectively added to the aluminum oxide so that a specific surface area of the porous alumina measured by a predetermined measuring method after heat treatment at 1200° C. for 30 hours is equal to or larger than a reference specific surface area of reference porous alumina for comparison in which the $SiO_2$ addition ratio is set to 3 mass % and the BaO addition ratio is set to 0 mass % with respect to the porous alumina.

It is needless to say that the same measurement method of the specific surface area is used for the porous alumina according to the present invention and the reference porous alumina for comparison. For example, a well-known nitrogen adsorption BET method can be used as well as the measurement of the specific surface area shown in FIG. 1.

In addition, $SiO_2$ addition amount is defined as an amount obtained by converting a content of silicon (Si) in porous alumina to a content of $SiO_2$, and the addition amount of barium is defined as an amount obtained by converting a content of barium (Ba) in porous alumina to a content of BaO. These provisions take into account that, in the porous alumina after preparation, the respective addition amounts are measured not as the addition amounts of silica and barium oxide but as the amounts of silicon and barium element by the X-ray fluorescent analyzer, and further, when a part of the added silica enters the alumina skeleton as silicon, the added silica and barium oxide may form an aluminate phase by solid phase reactions with alumina.

According to the porous alumina of the first feature described above, since when the $SiO_2$ addition ratio is within a range of 3 mass % or less and the BaO addition ratio is 14 mass % or less, the solid acid amount is equal to or less than the reference solid acid amount, and the $SiO_2$ addition ratio and the BaO addition ratio are set so that the specific surface area after the heat treatment at 1200° C. for 30 hours is equal to or more than the reference specific surface area, the porous alumina superior in heat resistance and coking resistance to porous alumina to which only silica is added is obtained for the reason described below.

First, the reason why the porous alumina having 3 mass % of the $SiO_2$ addition ratio and 0 mass % of the BaO addition ratio is used as the reference porous alumina serving as evaluation standards for heat resistance and coking resistance will be described.

FIG. 3 shows the evaluation results of the coking amount by performing steam reforming reactions on steam reforming catalysts carrying Ni (15 mass %) and La (10 mass % in terms of $La_2O_3$) on the porous alumina as a support, in which the $SiO_2$ addition ratio is within a range of 0.5 mass % to 20 mass % and the BaO addition ratio is 0 mass %.

The porous alumina was prepared in the same manner as the comparative sample with 0 mass % of the BaO addition ratio prepared by the kneading method described later.

The steam reforming catalyst was prepared by an impregnation method in the following manner. The above porous alumina was impregnated into a mixed aqueous solution of nickel nitrate and lanthanum nitrate at room temperature for 1 hour, evaporated to dryness using an evaporator, and then calcined at 450° C. for 5 hours. After the powder catalyst carrying Ni—La was pressure-molded by a press machine, pulverized in a mortar until it became granular, and sieved to a size of 180 μm or more and 250 μm or less.

The steam reforming reaction was carried out as follows. 0.5 ml of the catalyst was measured with a graduated cylinder and placed in a reaction tube made of stainless steel. As pretreatment of the catalyst, reduction treatment was carried out at 600° C. for 1 hour in a hydrogen stream. Afterwards, the steam reforming reaction was carried out at the flow rates of $C_3H_8$:60 ml/min, $N_2$:60 ml/min, $H_2$:6 ml/min, $H_2O$:360 ml/min. The reaction condition at this time was S/C=2.0 and SV=60000 $h^{-1}$. The temperature was raised at 10° C./min from room temperature, and held for 43 minutes when reaching 600° C. The product gas was sampled every 100° C. from 400° C., and the composition of the product gas was analyzed by gas chromatography.

A sample obtained by mixing 0.03 g of a sample of a catalyst subjected to the steam reforming reaction with 1 g of an auxiliary fuel material (tin-plated copper) was put into a crucible, and oxygen was used as a carrier gas (flow rate: 3 L/min) in a high-frequency combustion furnace to burn carbon in the sample, and the coking amount was measured using a carbon-sulfur analyzer (manufactured by LECO Japan Co., Ltd.: CS-200). The amount of carbon was measured by detecting carbon gasified by high-temperature combustion by infrared absorption method.

FIG. 4 shows the results of measuring the phase transition temperature to the α phase with using five samples, in which the $SiO_2$ addition ratio is within a range of 0 mass % to 5 mass % and the BaO addition ratio is 0 mass % (shown in solid circles), prepared by the same preparation method as the porous alumina of the steam reforming catalyst of FIG. 3, and one sample, in which the $SiO_2$ addition ratio is 1 mass % and the BaO addition ratio is 5 mass % (shown in an open circle), prepared by the same manner as the evaluation sample prepared by the kneading method described later.

The phase transition temperature was measured using a thermogravimetric measuring device (Rigaku, Differential-type Differential Thermal Balance, Thermo plus EVO2 TG-DTA TG8120) by placing 20 mg of the sample in a Pt-made pan and raising the temperature from room temperature at a temperature raising rate of 20° C./min. An exothermic reaction is observed when alumina undergoes a phase transition from δ, θ-alumina to α-alumina. Therefore, the exothermic peak temperature of the differential thermal analysis (DTA) curve was obtained as the phase transition temperature.

From the measurement results of the coking amount shown in FIG. 3, it is understood that almost no coking is observed when the $SiO_2$ addition ratio is less than or equal to 3 mass %, on the contrary, the coking amount increases roughly in proportion to the $SiO_2$ addition ratio when the $SiO_2$ addition ratio increases more than 3 mass %.

According to the measurement result of the phase transition temperature shown in FIG. 4, it is understood that when the BaO addition ratio is 0 mass %, the phase transition temperature increases from 1201° C. to 1282° C., 1290° C., 1396° C., and 1416° C. as the $SiO_2$ addition ratio increases from 0 mass % to 1 mass %, 2 mass %, 3 mass %, and 5 mass %, indicating that the heat resistance is improved as the $SiO_2$ addition ratio increases. Here, while the $SiO_2$ addition ratio increases from 0 mass % to 3 mass % and the phase transition temperature increases from 1201° C. to 1396° C. by 195° C., the $SiO_2$ addition ratio increases from 3 mass % to 5 mass % and the phase transition temperature increases from 1396° C. to 1416° C. by only 20° C. Therefore, the effect of improving the heat resistance with increasing the $SiO_2$ addition ratio is notably exhibited when the $SiO_2$ addition ratio is 3 mass % or less. The measurement result of FIG. 4 coincides with the relationship shown in FIG. 1 described above.

On the other hand, comparing two samples in which the $SiO_2$ addition ratio is 1 mass % and the BaO addition ratio is 0 mass % and 5 mass %, it is understood that when the BaO addition ratio increases from 0 mass % to 5 mass %, the phase transition temperature increases from 1282° C. to 1411° C. by 129° C.

From the measured results shown in FIG. 3 and FIG. 4, it is understood that the heat resistance can be greatly improved by setting the BaO addition ratio within a predetermined preferable range including 5 mass % with 3 mass % or less of the $SiO_2$ addition ratio while suppressing the increase of the coking amount by suppressing the $SiO_2$ addition ratio equal to or less than 3 mass %.

From the above description, it is understood that the porous alumina in which the $SiO_2$ addition ratio is 3 mass % and the BaO addition ratio is 0 mass % (reference porous alumina) has a certain level of heat resistance and coking resistance. However, when the $SiO_2$ addition ratio is reduced from 3 mass %, the heat resistance is reduced, and when the $SiO_2$ addition ratio is conversely increased from 3 mass %, the coking resistance is reduced. Therefore, 3 mass % of the $SiO_2$ addition ratio is a singular point on which the heat resistance and coking resistance can be compatible with each other. In other words, in the porous alumina to which only silica is added, it is substantially impossible to achieve both heat resistance and coking resistance exceeding the reference porous alumina. Therefore, in the porous alumina to which both silica and barium oxide are added, in order to improve both the heat resistance and the coking resistance than the porous alumina to which only silica is added, the reference porous alumina can be said to be appropriate as an evaluation criterion for heat resistance and coking resistance.

The effect of improving the heat resistance by adding barium oxide in addition to the addition of silica can be explained as follows.

The ion radius of Si is almost the same as that of aluminum (Al), and Si ions are incorporated into the structure of γ-alumina by decomposition of the alumina precursor at around 450° C. In γ-alumina with spinel structure, there are many vacancies in the octahedral site. By adding Si ions to alumina, Al ions at tetrahedral sites are replaced by Si ions and the total number of holes is reduced, so that α-transformation is suppressed and heat resistance is improved. The addition of silica is effective in preventing the micropores of alumina from being blocked, and exhibits an effect in improving the heat resistance in a temperature range of 1100° C. or less.

It is known that Ba ions exist as aluminates (barium hexaaluminate: $BaO·6Al_2O_3$, barium monoaluminate: $BaO·Al_2O_3$) by solid phase reactions with alumina at a high temperature of 1000° C. or more (see FIGS. 9 and 10). The aluminate is formed on the surface of the alumina particles, and suppresses the α-transformation inside the alumina particles. Since the aluminate on the particle surface is cubical crystal (fcc) and has the same structure as γ-alumina, strong interaction occurs by sharing oxygen ions on the alumina particle surface. This interaction suppresses the α-transformation inside the alumina particles.

When Ba is added to alumina alone, the formation of aluminate based on solid phase reaction is necessary. For this purpose, calcination at 1000° C. or higher is necessary, and the micropores of alumina are lost without suppressing the α-transformation in the temperature increasing process before the formation of aluminate, and the specific surface area is greatly lowered. However, alumina with silica coexisting, by the silica addition effect, it is possible to suppress the decrease in the specific surface area by suppressing the blockage of micropores in the temperature region of 1100° C. or less of the temperature increasing process before the formation of aluminate. Furthermore, at high temperatures above the temperature region, aluminate is formed by the solid phase reaction of Ba, and the α-transformation of alumina is suppressed.

In addition, as described later, it has been confirmed by the inventor of the present invention that, when the BaO addition ratio is increased from 0 mass % to 14 mass % or less at a given $SiO_2$ addition ratio of 3 mass % or less, the specific surface area after heat treatment at 1200° C. for 30 hours increases to exceed the reference specific surface area, and decreases toward the reference specific surface area after the BaO addition ratio exceeds the local maximum value (see FIGS. 11 and 14). When the $SiO_2$ addition ratio is within a range of 3 mass % or less and the BaO addition ratio is within a range of 14 mass % or less, there is certainly a combination of the $SiO_2$ addition ratio and the BaO addition ratio so that the specific surface area after the heat treatment at 1200° C. for 30 hours is equal to or more than the reference specific surface area, that is, heat resistance is improved compared to the reference porous alumina ($SiO_2$ addition ratio: 3 mass % and BaO addition ratio: 0 mass %). Therefore, the heat resistance is certainly improved by employing this combination.

In addition, from the relationships between the $SiO_2$ addition ratio, the BaO addition ratio, and the solid acid amount shown in FIGS. 13 and 15, which will be described later, it is understood that the solid acid amount monotonously decreases (the solid acidity decreases) when the BaO addition ratio is increased at a given $SiO_2$ addition ratio of 3 mass % or less. Therefore, as described above, the increase in the coking amount is further suppressed and the coking resistance is improved by suppressing the $SiO_2$ addition ratio to 3 mass % or less and further increasing the BaO addition ratio, since coking is likely to occur when the solid acidity of the porous support increases. In other words, adopting the combination of the $SiO_2$ addition ratio and the BaO addition ratio with improved heat resistance ensures improved coking resistance.

Therefore, when only silica is added, it has been difficult to achieve both heat resistance and coking resistance, but by adding barium oxide in addition to silica with suppressing the addition amount of silica, both heat resistance and coking resistance can be greatly improved as compared with the case of adding only silica.

Further, in the porous alumina according to the first feature, it is preferable that the $SiO_2$ addition ratio is within a range of 0.7 mass % or more and 3 mass % or less, and that the silica and the barium oxide are added respectively to the aluminum oxide so that the specific surface area of the porous alumina is equal to or larger than the reference specific surface area.

Further, in the porous alumina according to the first feature, it is preferable that the BaO addition ratio is within a range of 0.5 mass % or more and 14 mass % or less, and that the silica and the barium oxide are added respectively to the aluminum oxide so that the specific surface area of the porous alumina is equal to or larger than the reference specific surface area.

According to the preferred implementations of the porous alumina of the first feature described above, the combination of the $SiO_2$ addition ratio and the BaO addition ratio in which both the heat resistance and the coking resistance are improved is more surely present within the range of 0.7 mass % or more and 3 mass % or less of the $SiO_2$ addition ratio or within the range of 0.5 mass % or more and 14 mass % or less of the BaO addition ratio.

Further, as the second feature of the porous alumina according to the above first feature, provided that the $SiO_2$ addition ratio is Xs (mass %) and the BaO addition ratio is Xb (mass %), 0.7 mass %≤Xs≤1 mass % and 5 mass %≤Xb≤10 mass %, or 1 mass %≤Xs<2 mass % and 3 mass %≤Xb≤10 mass %, or 2 mass %≤Xs≤3 mass % and 1 mass %≤Xb≤14 mass %.

Further, as the third feature of the present invention, it is characterized by being porous alumina including silica ($SiO_2$) and barium oxide (BaO) added to aluminum oxide ($Al_2O_3$), wherein $SiO_2$ addition ratio (mass %) defined by a ratio of $SiO_2$ addition amount to a total mass of the aluminum oxide and the $SiO_2$ addition amount is Xs (mass %), provided that the $SiO_2$ addition amount is an amount obtained by converting a content of silicon (Si) in the porous alumina into a content of $SiO_2$, BaO addition ratio (mass %) defined by a ratio of BaO addition amount to a total mass of the aluminum oxide and the $SiO_2$ addition amount is Xb (mass %), provided that the BaO addition amount is an amount obtained by converting a content of barium (Ba) in the porous alumina into a content of BaO, 0.7 mass %≤Xs<1 mass % and 5 mass %≤Xb≤10 mass %, or 1 mass %≤Xs<2 mass % and 3 mass %≤Xb≤10 mass %, or 2 mass %≤Xs≤3 mass % and 1 mass %≤Xb≤14 mass %.

According to the porous alumina of the second or third feature, both heat resistance and coking resistance are surely improved compared to the reference porous alumina ($SiO_2$ addition ratio: 3 mass %, BaO addition ratio: 0 mass %) when the $SiO_2$ addition ratio Xs and the BaO addition ratio Xb are within the respective defined ranges.

Further, in the porous alumina of the second or third feature, it is preferable that 1 mass %≤Xs≤3 mass % and 3 mass %≤Xb≤10 mass %.

According to the above preferred implementations of the porous alumina of the second or third feature, both the heat resistance and the coking resistance can be further improved.

Further, the catalyst according to the present invention is characterized by comprising the porous alumina of the first or second feature and a catalytic substance supported on the porous alumina.

According to the catalyst of the above feature, heat resistance and coking resistance can be improved as compared with a catalyst using a conventional porous alumina as a support.

Effect of the Invention

According to the porous alumina of the present invention, by using barium oxide of a solid basic oxide, it is possible to have high heat resistance capable of maintaining a large specific surface area even at a high temperature by appropriately adjusting the addition amounts of silica and barium oxide, and also to suppress an increase of solid acid amount to realize high coking resistance by suppressing the addition amount of silica, and thus to provide high performance porous alumina excellent in both heat resistance and coking resistance. Further, by using the porous alumina as a catalyst support, it is possible to provide a catalyst excellent in both heat resistance and coking resistance.

BRIEF DESCRIPTION OF THE DRAWINGS

FIG. 11 is a table showing the measurement results of the specific surface areas of a plurality of evaluation samples and comparative samples, each of which differs in the $SiO_2$ addition ratio and the BaO addition ratio, prepared by the kneading method after heat treatment at 1200° C. for 30 hours.

FIG. 14 is a table showing the measurement results of the specific surface areas of a plurality of evaluation samples and comparative samples, each of which differs in the $SiO_2$ addition ratio and the BaO addition ratio, prepared by the first type of impregnating method after heat treatment at 1200° C. for 30 hours.

DESCRIPTION OF EMBODIMENT

Figure 1:
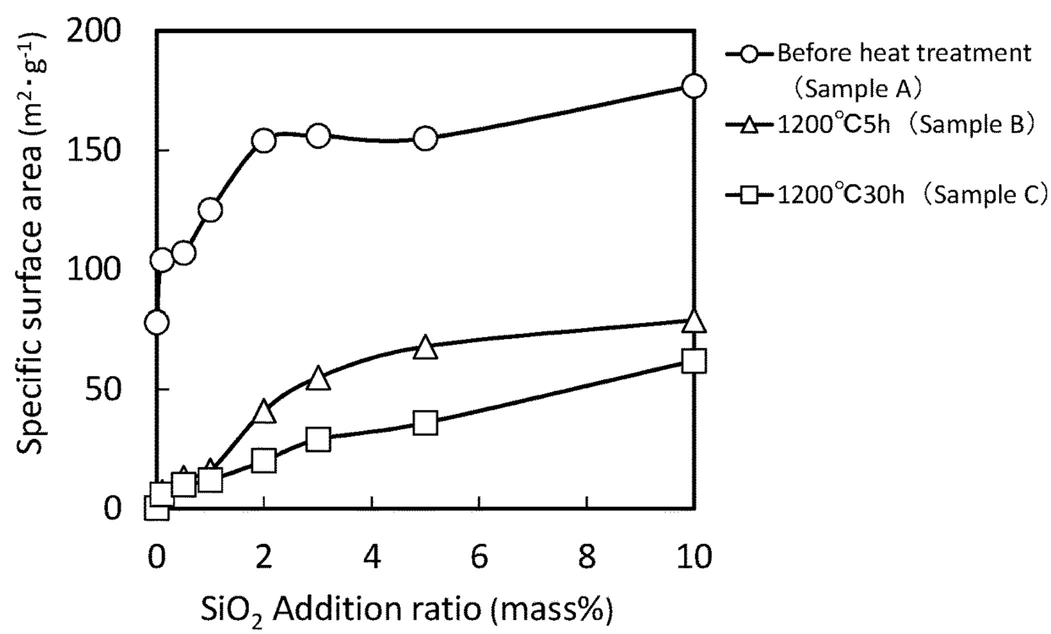
FIG. 1 is a graph showing the relationship between the $SiO_2$ addition ratio and the specific surface area of the porous alumina to which only silica is added under three different heat treatment conditions.

Preferred embodiments of the porous alumina according to the present invention (hereinafter, referred to as "the present embodiment" as appropriate) will be described.

The porous alumina according to the present embodiment (hereinafter referred to as "the present alumina" as appropriate) is porous alumina in which two kinds of oxides of silica ($SiO_2$) and barium oxide (BaO) are added to alumina (aluminum oxide, $Al_2O_3$). In the following description, "the present alumina" is alumina to which silica and barium oxide are added, and if simply referred to as "alumina", this is alumina to which silica and barium oxide are not added.

[1] A Method for Preparing the Present Alumina:

Next, a method for preparing the present alumina will be described. The method for preparing the present alumina is basically constituted by comprising a step for adding silica to alumina and a step for adding barium oxide to alumina. Depending on the difference in the process for adding barium oxide, the impregnation method, the kneading method, the precipitation method, and the sol-gel method may be candidates for the preparation method, but in the present embodiment, the kneading method and the impregnation method are used in the preparation of samples for evaluation of heat resistance and coking resistance of the present alumina.

Before describing details of the kneading method and the impregnation method, each addition ratio of silica and barium oxide added in the present alumina in this embodiment is defined as follows. The unit of the $SiO_2$ addition ratio and the BaO addition ratio described below is "mass %".

$$SiO_2 \text{ addition ratio} = SiO_2 \text{ addition amount}/(\text{mass of alumina} + SiO_2 \text{ addition amount}) \times 100$$

$$BaO \text{ addition ratio} = BaO \text{ addition amount}/(\text{mass of alumina} + SiO_2 \text{ addition amount}) \times 100$$

The $SiO_2$ addition amount is an amount obtained by converting a content of Si in the present alumina into a content of $SiO_2$, and the BaO addition amount is an amount obtained by converting a content of Ba in the present alumina into a content of BaO. The Si content is the content of all Si present as a single substance and a compound in the present alumina, and the Ba content is the content of all Ba present as a single substance and a compound in the present alumina.

In the present embodiment, the reference mass serving as the calculation reference of the $SiO_2$ addition ratio and the BaO addition ratio does not include the BaO addition amount because it is more convenient to unify the mass of alumina and the $SiO_2$ addition amount in the setting of the $SiO_2$ addition ratio and the BaO addition ratio in the method for preparing the present alumina described below. The above-mentioned $SiO_2$ addition ratio and BaO addition ratio can be easily converted into addition ratios based on the reference mass including the BaO addition amount. Further, if necessary, a unit of each addition ratio can be converted from "mass %" to "mol %."

Figure 5:
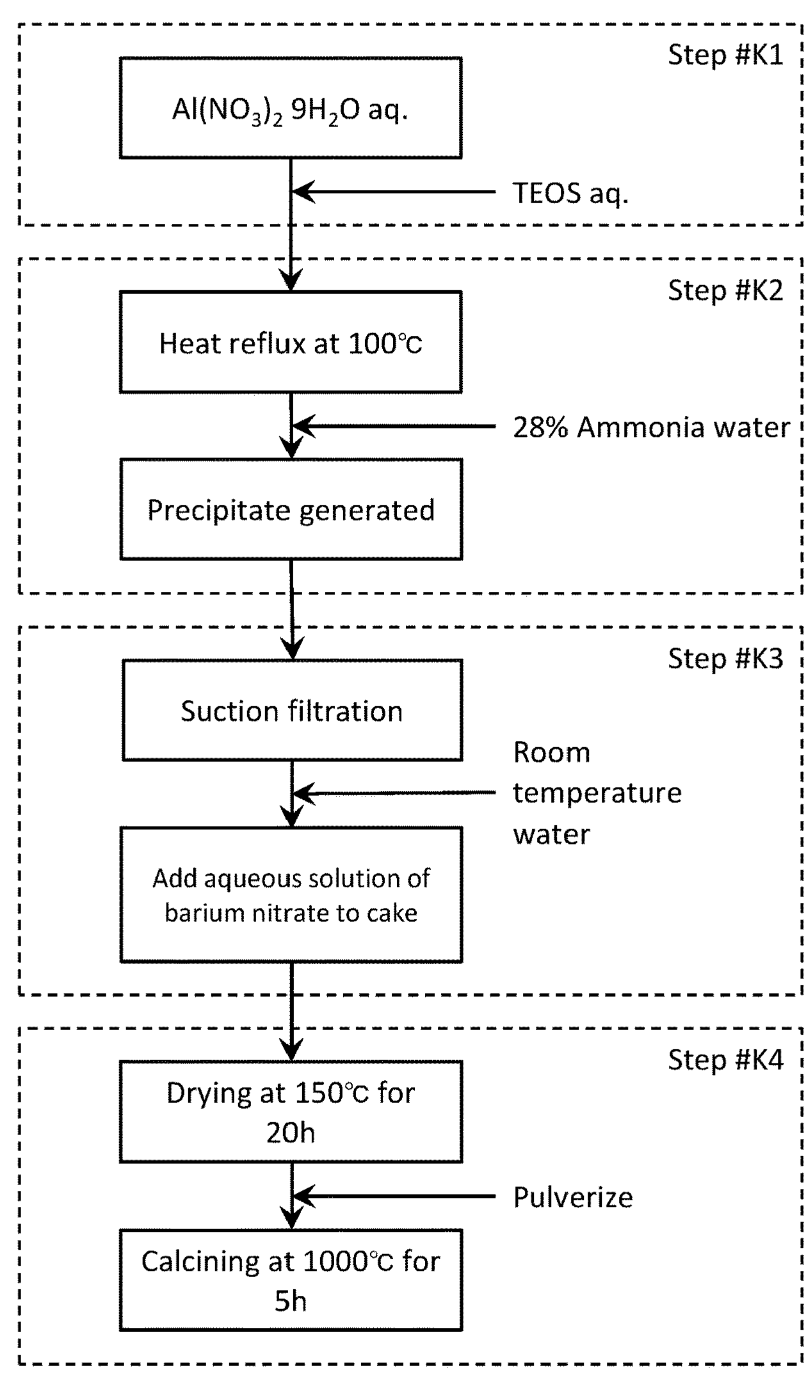
FIG. 5 is a process transition diagram showing an outline of a method for preparing the porous alumina according to the present invention by the kneading method.

[1.1] Preparation of the Present Alumina by the Kneading Method:

As shown in FIG. 5, the method for preparing the present alumina by the kneading method roughly comprises a step for preparing a mixed solution in which an aluminum compound and an alkoxysilane are dissolved in a mixed solvent by mixing an alkoxysilane solution which contains an alkoxysilane, the mixed solvent including water and alcohol, and an inorganic acid, with an aluminum solution which contains an aluminum compound and water (Step #K1), a step for forming a precipitate by coprecipitating aluminum hydroxide with a silicon compound in the mixed solvent (Step #K2), a step for kneading the precipitate by adding an aqueous solution of a barium compound to the precipitate (Step #K3), and a step for drying and calcining the precipitate in which the barium compound is kneaded to form porous alumina including alumina, silica and barium oxide (the present alumina) (Step #K4).

In Step #K1, for example, tetraethoxysilane (hereinafter, referred to as "TEOS") is suitably used for the alkoxysilane contained in the alkoxysilane solution, and for example, ethanol is suitably used for the alcohol, and for example, hydrochloric acid or nitric acid is suitably used for the inorganic acid, but is not limited thereto.

From the viewpoint of improving heat resistance, it is preferable to prepare the aluminum solution in Step #K1 by dissolving aluminum nitrate in water or dissolving aluminum hydroxide in nitric acid aqueous solution.

The mixing ratio of the alkoxysilane and the aluminum compound in the mixed solution prepared in Step #K1 is adjusted so that the addition ratio of silica in the porous alumina formed in Step #K3 ($SiO_2$ addition ratio) becomes a desired value.

The alkoxysilane and the aluminum compound in the mixed solution prepared in Step #K1 are uniformly dissolved in a mixed solvent composed of water and alcohol. In other words, the mixed solution forms a single liquid phase without phase separation.

In Step #K2, a precipitant containing a basic compound is added to the acidic mixed solution, preferably while heating to 40° C. to 100° C. (e.g., while heating to 100° C. under reflux). By adding a basic compound until the pH of the mixed solution becomes about 8 (e.g., 8 to 8.5), aluminum hydroxide and the silicon compound are coprecipitated. The silicon compound contained in the precipitate generated by coprecipitation may be an alkoxysilane or a hydrolytic condensate thereof.

The precipitant includes, for example, at least one kind of basic compounds selected from a group consisting of ammonia water, sodium hydroxide, potassium hydroxide and urea. Among these, ammonia water is preferred.

In Step #K3, it is preferable that the precipitate is taken out from the mixed solution by an ordinary method such as filtration, for example, and washed with room temperature water (distilled water). An aqueous solution of a barium compound is added to the precipitate after washed with water to be kneaded. It is preferable that the aqueous solution of the barium compound is prepared as an aqueous solution of barium nitrate by dissolving barium nitrate in water or as an aqueous solution of barium hydroxide by dissolving barium hydroxide in water.

In Step #K4, a precipitate obtained by kneading a barium compound is dried, for example, in a dryer at 150° C. for a predetermined time and then the dried precipitate is pulverized, for example, by a mortar or the like to be powdered. By calcining the dried and powdered precipitate, for example, at 1000° C. in air for 5 hours, the porous alumina containing alumina, silica and barium oxide (the present alumina) is formed. In the porous alumina to be formed, alumina is mainly composed of intermediate alumina such as γ-alumina and θ-alumina.

[1.2] Preparation of the Present Alumina by Impregnation Method:

In the method for preparing the present alumina by an impregnation method, there are the first type of impregnation method in which silica and barium oxide are added to existing porous alumina by an impregnation method to prepare the present alumina, and the second type of impregnation method in which silica-added porous alumina in which silica is added to alumina is prepared, and barium oxide is added to the silica-added porous alumina by an impregnation method to prepare the present alumina.

Figure 6:
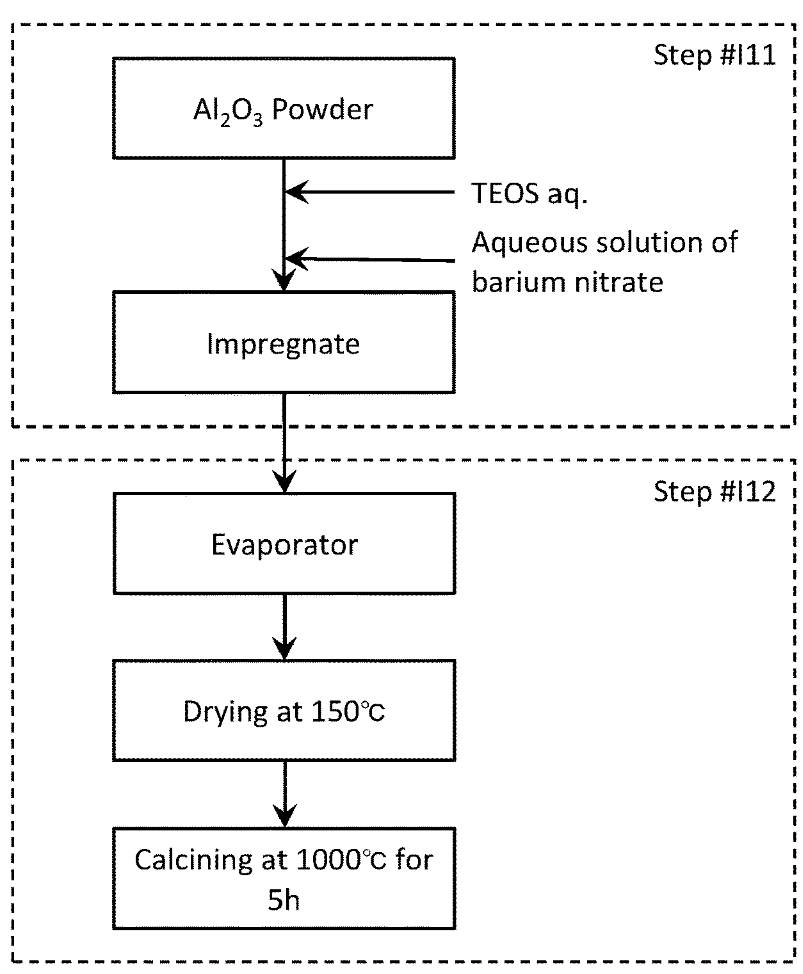
FIG. 6 is a process transition diagram showing an outline of a method for preparing the porous alumina according to the present invention by the first type of impregnation method.

[1.2.1] The First Type of Impregnation Process:

As shown in FIG. 6, the first type of impregnation method roughly comprises a step for impregnating an alkoxysilane solution and an aqueous solution of a barium compound into the existing porous alumina ($Al_2O_3$ powder) (Step #I11), and a step for drying and calcining the porous alumina impregnated with the alkoxysilane solution and the aqueous solution of the barium compound to form the porous alumina containing alumina, silica, and barium oxide (the present alumina) (Step #I12).

As the existing porous alumina used in Step #I11, porous alumina composed primarily of intermediate alumina such as γ-alumina, θ-alumina, and the like is used. For example, in the examples of the present embodiment, the C20 manufactured by Nippon Light Metal is used as the existing porous alumina, but is not limited to the porous alumina manufactured by Nippon Light Metal, and may be prepared independently. Further, TEOS is preferably used for the alkoxysilane contained in the alkoxysilane solution of Step #I11, as well as Step #K1 of the kneading method. In addition, it is preferable that the aqueous solution of the barium compound of Step #I11 is prepared as an aqueous solution of barium nitrate by dissolving barium nitrate in water or as an aqueous solution of barium hydroxide by dissolving barium hydroxide in water, as well as Step #K3 of the kneading method.

In Step #I12, the porous alumina impregnated with the alkoxysilane solution and the aqueous solution of the barium compound is dried, for example, at 150° C. in air or by a rotary evaporator, and then, for example, calcined at 1000° C. in air for 5 hours to obtain the porous alumina containing alumina, silica, and barium oxide (the present alumina).

Figure 7:
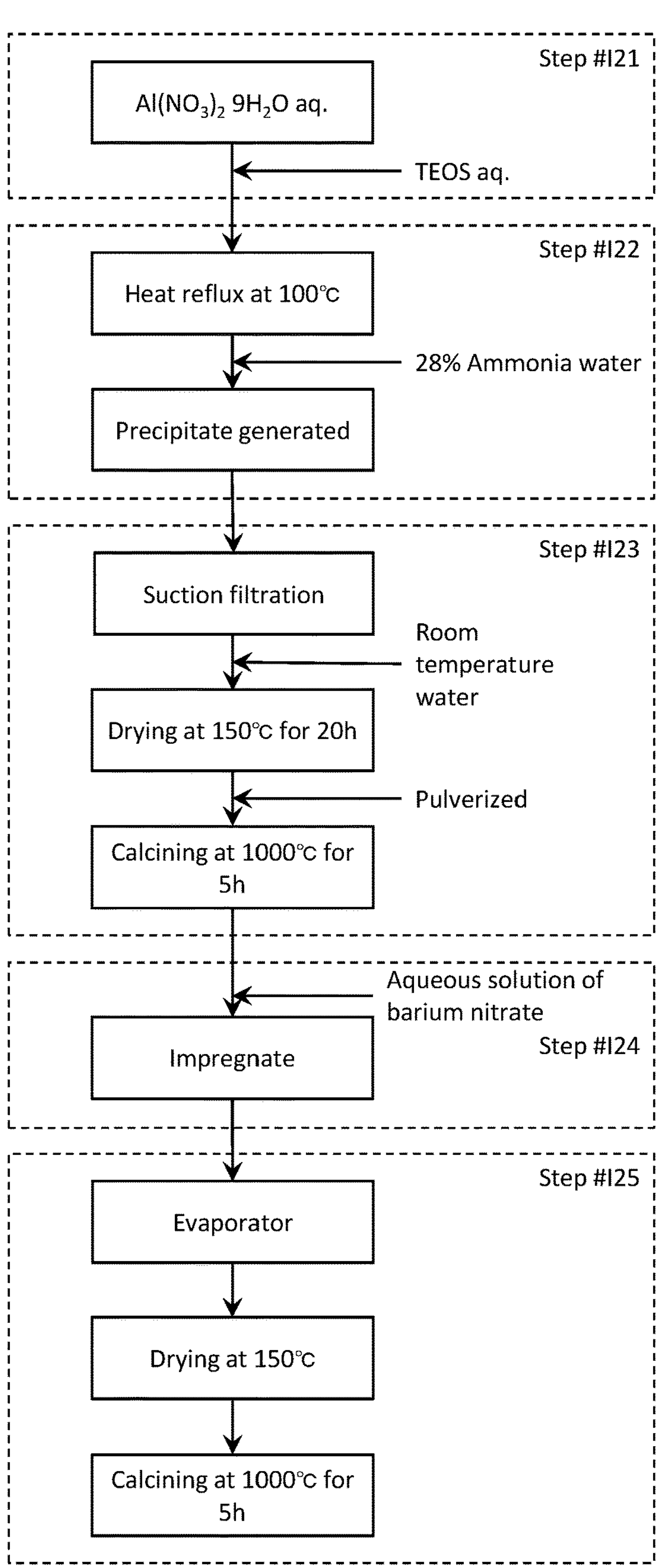
FIG. 7 is a process transition diagram showing an outline of a method for preparing the porous alumina according to the present invention by the second type of impregnation method.

[1.2.2] The Second Type of Impregnation Process:

As shown in FIG. 7, the second type of impregnation method roughly comprises a step for preparing a mixed solution in which an aluminum compound and an alkoxysilane are dissolved in a mixed solvent by mixing an alkoxysilane solution which contains an alkoxysilane, the mixed solvent including water and alcohol, and an inorganic acid, with an aluminum solution which contains an aluminum compound and water (Step #I21), a step for forming a precipitate by coprecipitating aluminum hydroxide with a silicon compound in the mixed solvent (Step #I22), a step for drying and calcining the precipitate to form porous alumina containing alumina and silica (silica-added porous alumina) (Step #I23), a step for impregnating an aqueous solution of a barium compound into the silica-added porous alumina (Step #I24), and a step for drying and calcining the silica-added porous alumina impregnated with the aqueous solution of the barium compound to form the porous alumina containing alumina, silica and barium oxide (the present alumina) (Step #I25).

Steps #I21 and #I22 of the second type of impregnation method are basically the same as Steps #K1 and #K2 of the kneading method described above, and a duplicate description thereof will be omitted. Further, the method for preparing the silica-added porous alumina of Steps #I21 to #I23 is the same as the method for preparing a comparative sample in which the BaO addition ratio is 0 mass %, which will be described later, except for the difference in the calcination temperature between Step #K4 and Step #I23.

Incidentally, in the second type of impregnation method, as the silica-added porous alumina used in Step #I24, existing silica-added porous alumina may be used instead of the one prepared by Step #I21 to Step #I23.

In Step #I23, it is preferable that the precipitate is taken out from the mixed solution by an ordinary method such as filtration, for example, and washed with room temperature water (distilled water). After the precipitate is dried and most of the solvent is removed, it is pulverized by a mortar or the like to be powdered.

By calcining the dried and powdered precipitate, the silica-added porous alumina is formed. Alumina constituting the silica-added porous alumina is mainly composed of intermediate alumina such as γ-alumina and θ-alumina.

The calcination temperature is preferably from 400 to 1000° C. If the calcination temperature is too high, the transition of aluminum oxide to the α phase may proceed and the specific surface area may decrease. The calcination time is preferably on the order of 1 hour to several tens of hours.

In Step #I24, it is preferable that the aqueous solution of the barium compound is prepared as an aqueous solution of barium nitrate by dissolving barium nitrate in water or as an aqueous solution of barium hydroxide by dissolving barium hydroxide in water, as in Step #K3 of the kneading method.

In Step #I25, the silica-added porous alumina impregnated with the aqueous solution of the barium compound is dried, for example, at 150° C. in air or by a rotary evaporator, and then, for example, calcined at 1000° C. in air for 5 hours to obtain the porous alumina containing alumina, silica, and barium oxide (the present alumina) as in Step #I12 of the first type of impregnation method.

The present alumina prepared by the kneading method, the first or second type of impregnation method is mainly composed of intermediate alumina such as γ-alumina, θ-alumina, and the like. Further, as an example, the present alumina is in a powder form obtained by pulverizing secondary particles in which needle-like or fibrous primary particles are aggregated and sieving them into a predetermined particle size range (e.g., 100 μm to 500 μm). The present alumina may have various shapes, such as a pellet shape, a disk shape, or a honeycomb shape, in addition to the powder form.

In the above-mentioned kneading method, the first or second type of impregnation method, the amount of silicon and barium added to the alumina is defined by the addition amount of each solution. That is, since the total amount of silicon and barium in the solution is added to the alumina by evaporation to dryness of the added solution, the above-mentioned $SiO_2$ addition ratio and BaO addition ratio are uniquely determined by a given mass of alumina or an amount of the alkoxysilane solution used and the addition amounts of the respective solutions.

[2] Evaluation of Heat Resistance and Coking Resistance of the Alumina Prepared by the Kneading Method:

[2.1] Preparation of Evaluation and Comparative Samples:

Evaluation samples were prepared as described below by the kneading method shown in FIG. 5.

As the alkoxysilane solution of Step #K1, 7.52 g of ethanol was added to 5.00 g of TEOS, and the mixture was stirred at room temperature for 5 minutes, and then 1.25 g of hydrochloric acid (37 mass %) was added thereto, and the mixture was stirred at room temperature for another 5 minutes. To this mixed solution, 71.23 g of water was mixed to obtain a clear and uniform 5.88 mass % of TEOS solution.

In Step #K1, TEOS solution obtained as described above was added to a predetermined amount of 20 mass % of an aqueous solution of aluminum nitrate to obtain a uniform mixed solution. The TEOS solution and the aqueous solution of aluminum nitrate were used in amounts required for the desired $SiO_2$ addition ratio. This mixed solution was heated under reflux, and 28 mass % of ammonia water was added dropwise until pH8.5 was obtained, and the mixture was stirred. Aluminum hydroxide and a silicon compound are coprecipitated with the dropping of ammonia water, and a precipitate was formed in the solution. The precipitate was filtered off by suction filtration using a No. 1 filter paper. This precipitate was washed with distilled water. A predetermined amount of barium nitrate aqueous solution was added to the precipitate after washed with water to be kneaded. Then it was dried for 20 hours in a dryer at 150° C. The dried precipitate was pulverized in a mortar and calcined at 1000° C. in air for 5 hours to obtain the evaluation sample of the present alumina.

As comparative samples, three kinds of comparative samples in which only the $SiO_2$ addition ratio was 0 mass %, only the BaO addition ratio was 0 mass %, and both the $SiO_2$ addition ratio and the BaO addition ratio were 0 mass % were also prepared. The evaluation samples and the comparative samples are denoted by the symbol SK(Xs, Xb). Xs represents the $SiO_2$ addition ratio (mass %), and Xb represents the BaO addition ratio (mass %).

The comparative samples of Xs=0 mass % were prepared using a blank solution containing no TEOS (a solution containing ethanol and hydrochloric acid adjusted in concentration with water) instead of the TEOS solution in Step #K1. The comparative samples of Xb=0 mass % were prepared by omitting a step of adding an aqueous solution of a barium compound to a precipitate after suction filtration and washing with water to be kneaded in Step #K3.

[2.2] Sample Evaluation Methods:

Determination of the specific surface area of each sample was performed by the nitrogen adsorption BET method using a fully automated gas adsorption amount measuring device (BELSORP-max manufactured by MicrotracBEL) under the following 3 types of heat treatment conditions. The first heat treatment condition is a state before the other two types of heat treatment are performed ("before heat treatment"). The second heat treatment condition is a state after raising the temperature to 1200° C. at 10° C./min from room temperature, and then stopping the heating and holding for 5 hours at 1200° C. ("1200° C.-5 hours"). The third heat treatment condition is a state after raising the temperature to 1200° C. at 10° C./min from room temperature, and then stopping the heating and holding for 30 hours at 1200° C. ("1200° C.-30 hours").

Crystalline structure of each sample was measured by way of a two-dimensional high-speed detector, through irradiation of CuKα, using an X-ray diffractometer (ULTIMA III, manufactured by Rigaku Corporation). Amounts of Al, Si and Ba in each sample were analyzed by a glass bead method using a fluorescent X-ray analyzer (Supermini manufactured by Rigaku Corporation). The solid acid and solid base amounts of the samples were measured by the temperature-programed desorption method (TPD, base probe molecule: $NH_3$, acid probe molecule: $CO_2$) using a catalyst evaluation device (BELCAT manufactured by MicrotracBEL).

Evaluation method of the sample is the same in the evaluation of heat resistance and coking resistance for the present alumina prepared by the first type of impregnation method described later.

Figure 8:
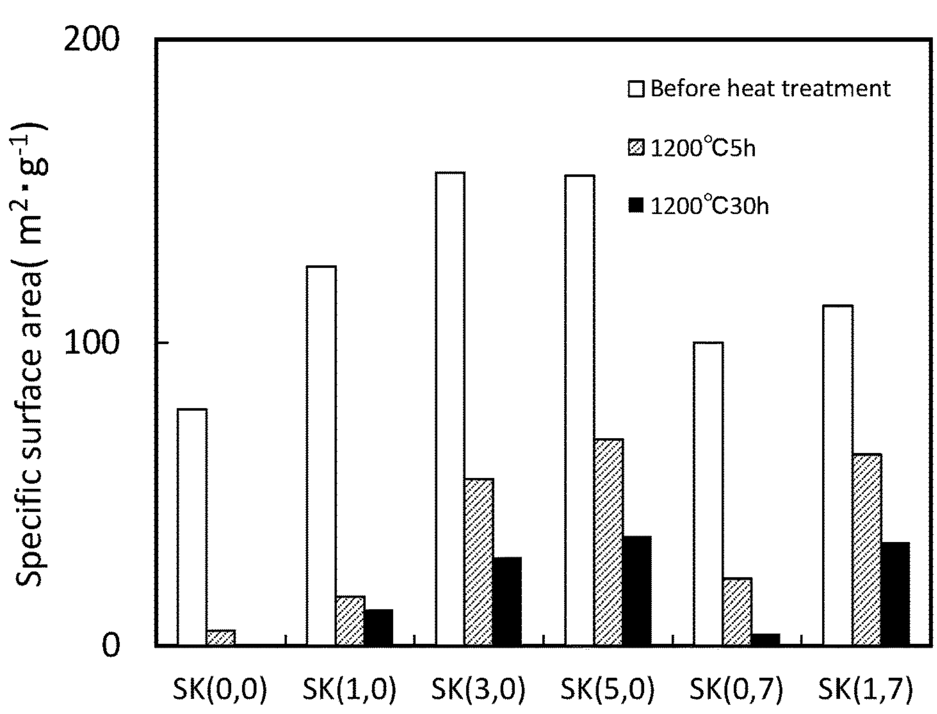
FIG. 8 is a graph showing the measurement results of the specific surface area of the evaluation sample and the comparative samples prepared by the kneading method under three different heat treatment conditions.

[2.3] Evaluation Results of Heat Resistance:

FIG. 8 shows the measurement results of the specific surface area with respect to one evaluation sample and five comparative samples prepared by the kneading method under the respective heat treatment conditions of "before heat treatment", "1200° C.-5 hours", and "1200° C.-30 hours". The evaluation and comparative samples used were SK(1, 7), SK(0, 0), SK(1, 0), SK(3, 0), SK(5, 0), and SK(0, 7).

Figure 9:
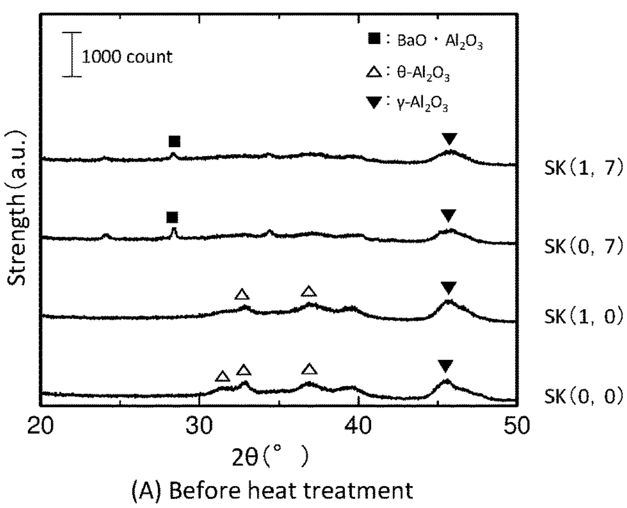
FIG. 9 is graphs showing XRD diffraction patterns which show crystal structures of the evaluation sample and the comparative samples prepared by the kneading method under three different heat treatment conditions.
Figure 9:
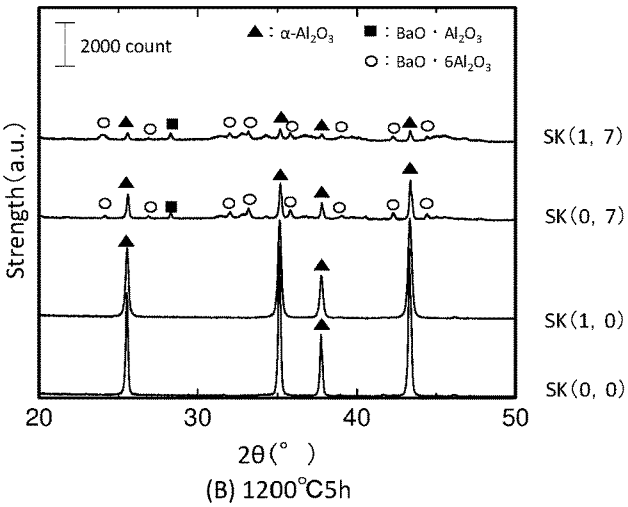
Figure 9:
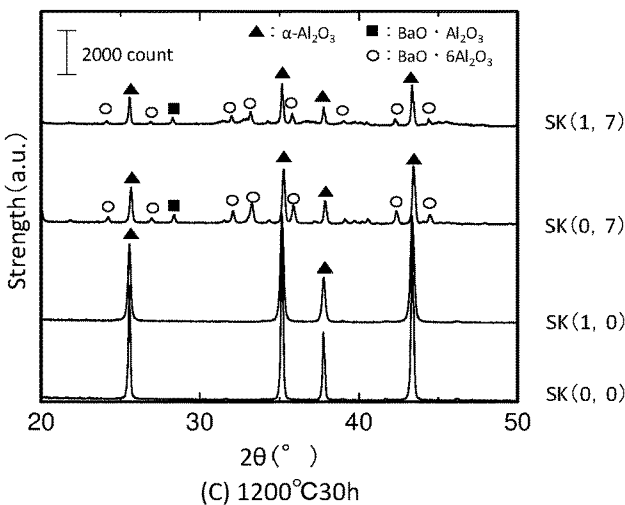
Figure 10:
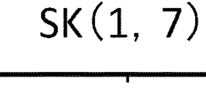
FIG. 10 is a graph showing an XRD diffraction pattern which shows the crystal structure of the evaluation sample shown in FIG. 9.
Figure 10:
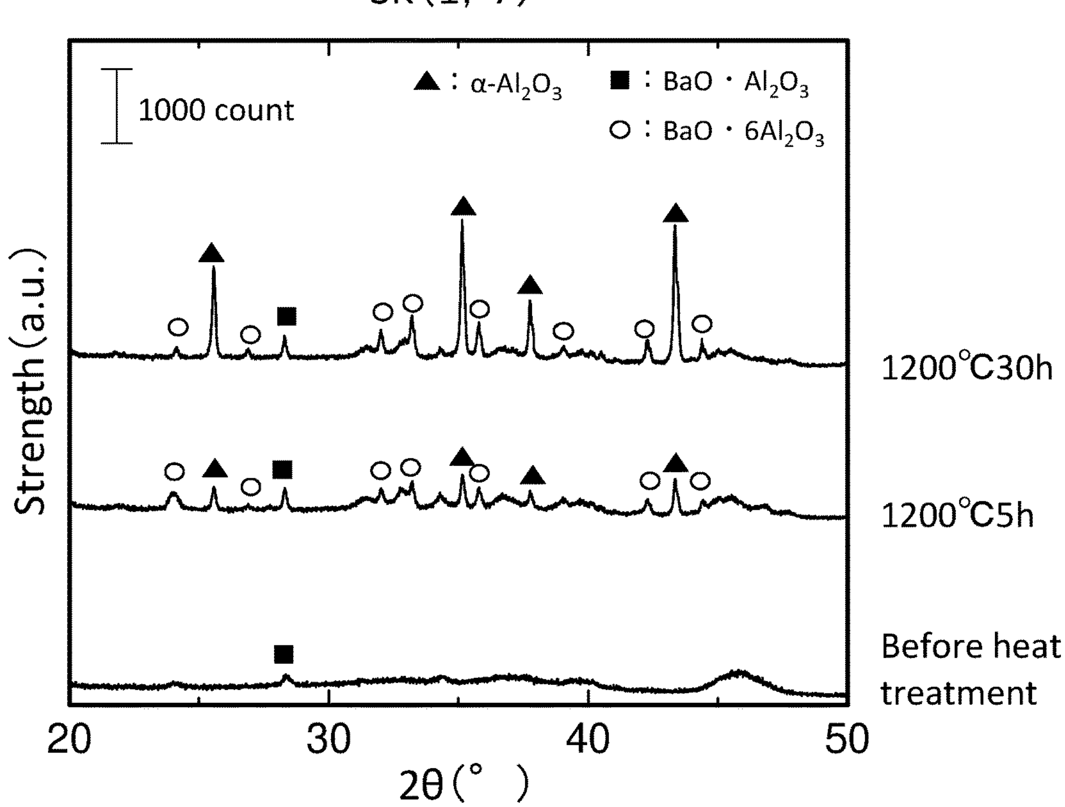

FIG. 9 shows XRD diffraction patterns showing crystal structures of one evaluation sample and three comparative samples prepared by the kneading method under heat treatment conditions of "before heat treatment", "1200° C.-5 hours", and "1200° C.-30 hours". The evaluation and comparative samples used were SK(1, 7), SK(0, 0), SK(1, 0), and SK(0, 7). Further, FIG. 10 shows XRD diffraction patterns in three types of heat treatment conditions of the evaluation sample SK(1, 7) shown in FIG. 9 by combining them in one graph.

FIG. 11 shows the measurement results of the specific surface area after heat treatment of "1200° C.-30 hours" with respect to the evaluation samples and comparative samples prepared by the kneading method by increasing the number of samples. The number of evaluation samples was 90 and the number of comparative samples was 24, and the ranges of the $SiO_2$ addition ratio and the BaO addition ratio were as wide as $0 \leq Xs \leq 30$ and $0 \leq Xb \leq 100$.

According to FIG. 8, in comparative sample SK(0, 7) with only barium oxide added, no remarkable improvement in the specific surface area by the addition of barium oxide was observed in any of the heat treatment conditions, as compared with the addition of silica. However, after the heat treatment of "1200° C.-5 hours", the specific surface area of the evaluation sample SK(1, 7) was improved more than that of the comparative samples SK(1, 0) and SK(0, 7), and even after the heat treatment of "1200° C.-30 hours", the evaluation sample SK(1, 7) was able to maintain a larger specific surface area than that of the comparative samples SK(1, 0) and SK(0, 7), and it was confirmed that the mixed addition of silica and barium oxide was effective for improving the heat resistance. After each heat treatment of "1200° C.-5 hours" and "1200° C.-30 hours", the specific surface area of the evaluation sample SK(1, 7) was improved more than that of the comparative sample SK(3, 0), and even if the $SiO_2$ addition ratio was reduced from 3 mass % to 1 mass %, it was confirmed that by adding an appropriate amount of barium oxide, a specific surface area larger than the specific surface area (corresponding to the reference specific surface area) of the comparative sample to which only 3 mass % of silica was added (corresponding to the reference porous alumina for comparison) was obtained.

According to FIG. 9(A), at "before heat treatment", in SK(0, 0) and SK(1, 0), the peaks of $\theta$-$Al_2O_3$ and $\gamma$-$Al_2O_3$ were confirmed, and in SK(0, 7) and SK(1, 7), the peaks of $\gamma$-$Al_2O_3$ and barium monoaluminate (BaO—$Al_2O_3$) were confirmed. According to FIG. 9(B), after the heat treatment of "1200° C.-5 hours", it was confirmed that SK(0, 0) and SK(1, 0) have completely transferred to $\alpha$-$Al_2O_3$, and in SK(0, 7) and SK(1, 7), in addition to the peak of $\alpha$-$Al_2O_3$, the peaks of barium monoaluminate and barium hexaaluminate ($BaO-6Al_2O_3$) were confirmed. According to FIG. 9(C), after heat treatment of "1200° C.-30 hours", the same products as after heat treatment of "1200° C.-5 hours" were seen. However, the peak strength of $\alpha$-$Al_2O_3$ of SK(1, 7) is lower than that of other comparative samples, and also the specific surface area remains high after heat treatment of "1200° C.-30 hours" as shown in FIG. 8. Therefore, it was clarified that coexistence of silica and barium oxide suppresses the formation of $\alpha$-$Al_2O_3$ and contributes to heat resistance.

It is understood from FIG. 11 that within the ranges that the $SiO_2$ addition ratio Xs is 0.7 mass % or more and 3 mass % or less and the BaO addition ratio Xb is 0.5 mass % or more and 14 mass % or less, the first effective range of the $SiO_2$ addition ratio Xs and the BaO addition ratio Xb, in which the specific surface area is equal to or more than the specific surface area of the comparative sample SK(3, 0) corresponding to the reference porous alumina (corresponding to the reference specific surface area) even after heat treatment of "1200° C.-30 hours", widely exist (the first effective range: a region surrounded by a thick line in FIG. 11). When the BaO addition ratio Xb increases from 0.5 mass % with the same $SiO_2$ addition ratio Xs, the specific surface area reaches a local maximum value exceeding the reference specific surface area, and thereafter, decreases to the reference specific surface area or less. Here, it is understood that the range of the BaO addition ratio Xb at which the specific surface area is equal to or more than the reference specific surface area becomes wider as the $SiO_2$ addition ratio Xs increases.

It is understood from FIG. 11 that the specific surface area after heat treatment of "1200° C.-30 hours" can be maintained or improved by 1 to 1.724 times as large as that of the reference porous alumina by setting the BaO addition ratio Xb as shown below in accordance with the $SiO_2$ addition ratio Xs. Even if the $SiO_2$ addition ratio Xs is reduced from 3 mass % to 0.7 mass %, the specific surface area is 1 to 1.034 times the reference specific surface area when the BaO addition ratio Xb is within a range of 5 mass %≤Xb≤10 mass %, and almost the same heat resistance as that of the reference porous alumina can be achieved. Even if the $SiO_2$ addition ratio Xs is reduced from 3 mass % to 1 mass %, the specific surface area is 1 to 1.414 times the reference specific surface area when the BaO addition ratio Xb is within a range of 3 mass %≤Xb≤10 mass %, and the heat resistance almost equal to or higher than that of the reference porous alumina can be achieved. Even if the $SiO_2$ addition ratio Xs is reduced from 3 mass % to 2 mass %, the specific surface area is 1 to 1.655 times the reference specific surface area when the BaO addition ratio Xb is within a range of 1 mass %≤Xb≤14 mass %, and the heat resistance almost equal to or higher than that of the reference porous alumina can be achieved. When the $SiO_2$ addition ratio Xs is 3 mass %, the specific surface area is 1.207 to 1.724 times the reference specific surface area when the BaO addition ratio Xb is within a range of 0.5 mass %≤Xb≤14 mass %, and 20% or higher heat resistance than that of the reference porous alumina can be achieved. In particular, when the $SiO_2$ addition ratio Xs is within a range of 1 to 3 mass %, the specific surface area can be improved by about 1.4 to 1.7 times the reference specific surface area by making the BaO addition ratio Xb close to around 5 mass %, and heat resistance can be further improved.

As described above, the first effective range of the $SiO_2$ addition ratio Xs and the BaO addition ratio Xb in which the specific surface area after heat treatment of "1200° C.-30 hours" is equal to or larger than the reference specific surface area is substantially as follows.

0.7 mass %≤Xs<1 mass %, and 5 mass %≤Xb≤10 mass % or, 1 mass %≤Xs<2 mass %, and 3 mass %≤Xb≤10 mass % or, 2 mass %≤Xs≤3 mass %, and 1 mass %≤Xb≤14 mass %.

However, even outside the first effective range described above, for example, the specific surface area of the evaluation sample SK(3, 0.5) having 3 mass % of the $SiO_2$ addition ratio Xs and 0.5 mass % of the BaO addition ratio Xb is larger than the reference specific surface area, and in the vicinity of the thick line in FIG. 11, the specific surface area after heat treatment of "1200° C.-30 hours" may be equal to or larger than the reference specific surface area.

Figure 12:
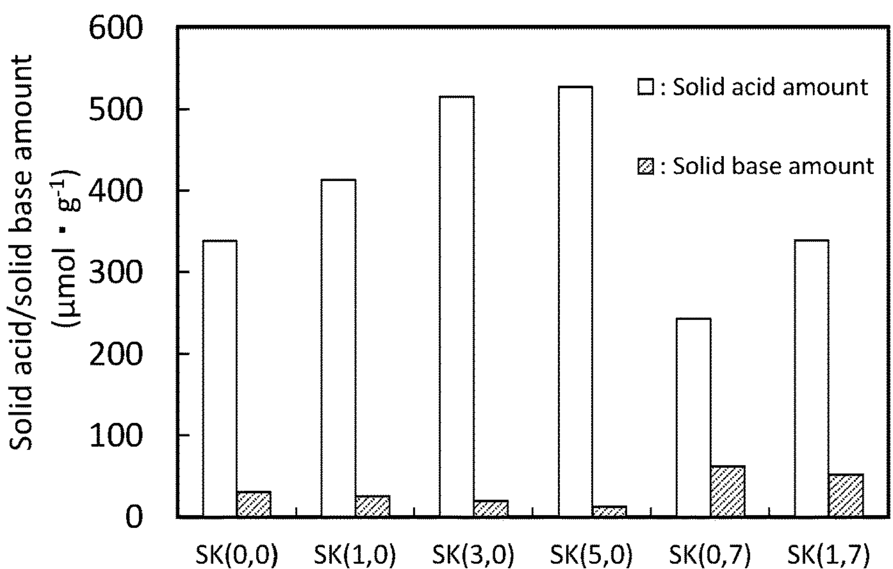
FIG. 12 is a graph showing the measurement results of the solid acid amount and the solid base amount of the evaluation sample and the comparative samples prepared by the kneading method.

[2.4] Evaluation Results of Coking Resistance:

FIG. 12 shows the measurement results of the solid acid amount and the solid base amount of one evaluation sample and five comparative samples prepared by the kneading method. The evaluation and comparative samples used were SK(1, 7), SK(0, 0), SK(1, 0), SK(3, 0), SK(5, 0), and SK(0, 7).

Figure 13:
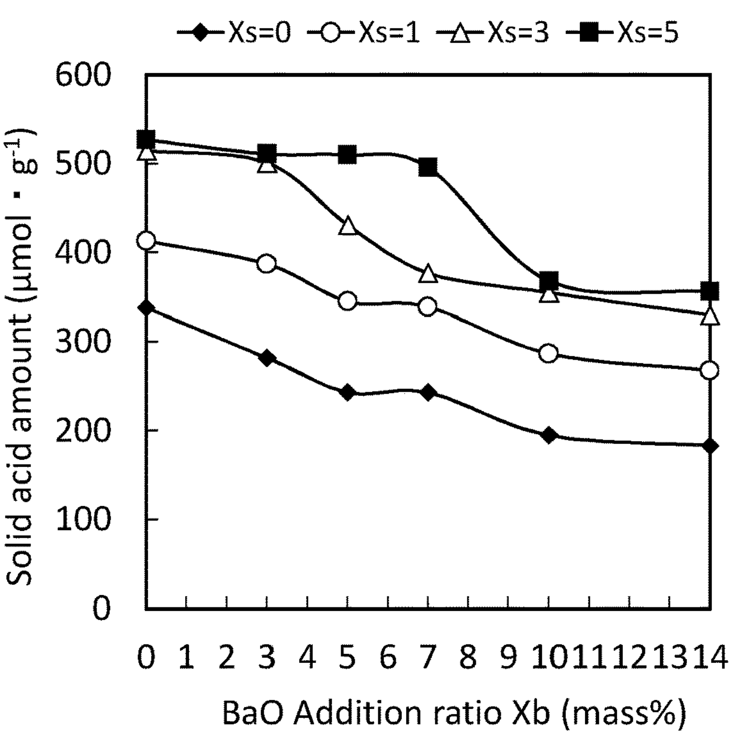
FIG. 13 is a graph showing the measurement results of the solid acid amount of a plurality of evaluation samples and comparative samples, each of which differs in the $SiO_2$ addition ratio and the BaO addition ratio, prepared by the kneading method.

FIG. 13 shows the measurement results of the solid acid amount of the evaluation sample and comparative samples prepared by the kneading method by increasing the number of samples. The number of evaluation samples was 15 and the number of comparative samples was 9, and the ranges of the $SiO_2$ addition ratio and the BaO addition ratio were as wide as 0≤Xs≤5 and 0≤Xb≤14.

Figure 2:
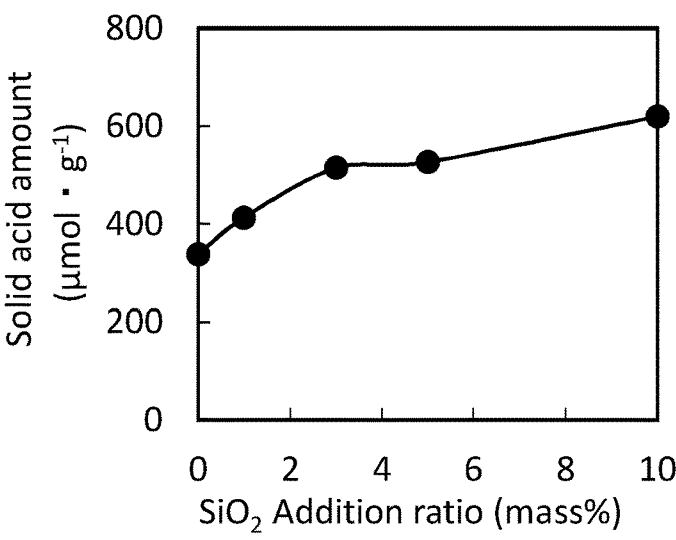
FIG. 2 is graphs showing the measurement results of the $SiO_2$ addition ratio and the solid acid amount, and the measurement results of the $SiO_2$ addition ratio and the solid base amount, for the porous alumina to which only silica is added.
Figure 2:
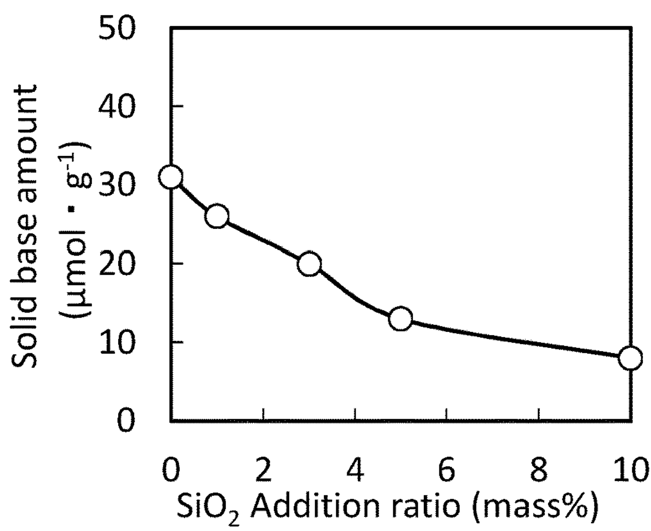
Figure 3:
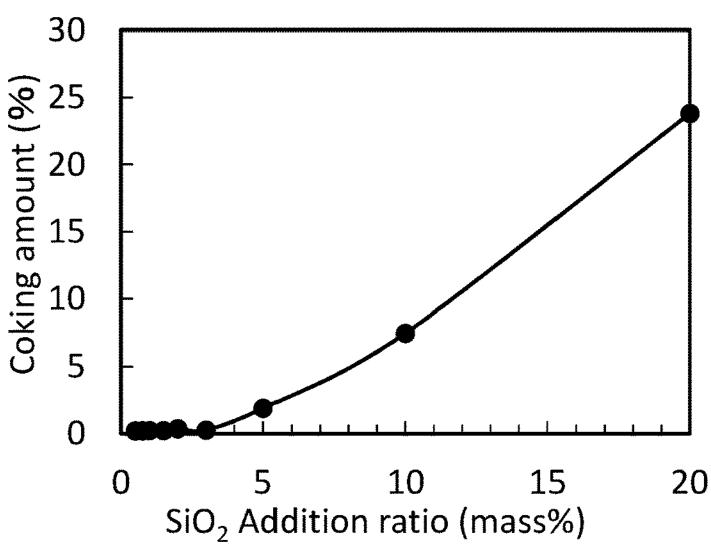
FIG. 3 is a graph showing the measurement results of the $SiO_2$ addition ratio and the coking amount for steam reforming catalysts in which Ni—La is supported on the porous alumina to which only silica is added.
Figure 4:
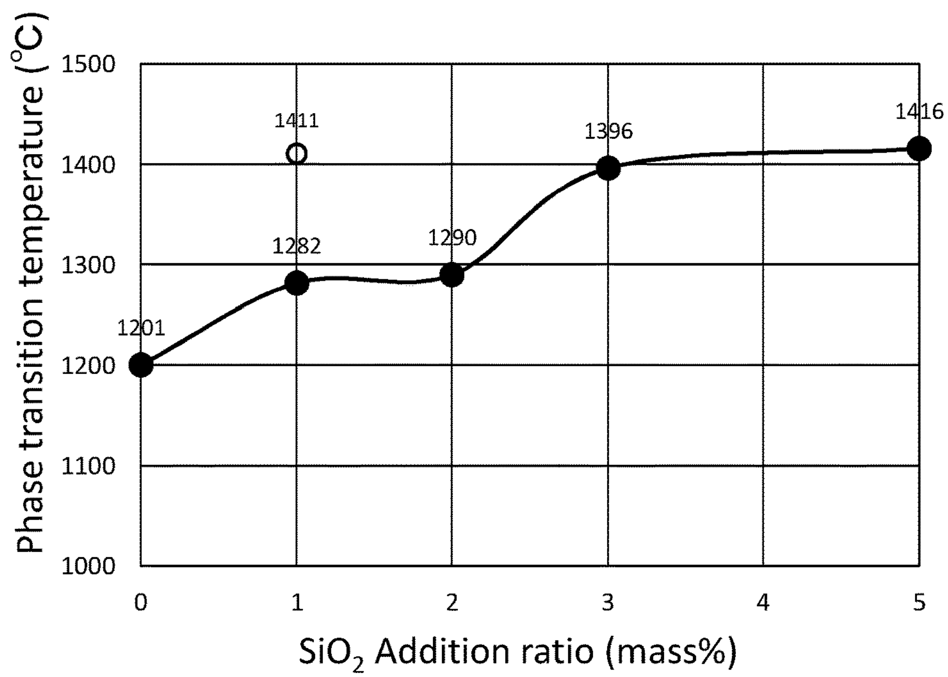
FIG. 4 is a graph showing the measurement results of the phase transition temperature to a phase in the porous alumina to which only silica is added and the porous alumina to which silica and barium oxide are added.

According to FIG. 12, in the comparative sample in which the BaO addition ratio Xb is 0 mass %, the solid acid amount increases and the solid base amount decreases as the $SiO_2$ addition ratio Xs increases, similarly to the measurement result shown in FIG. 2. On the other hand, in the evaluation sample SK(1, 7) and the comparative sample SK(0, 7) in which the BaO addition ratio Xb is 7 mass % and barium is added, the solid acid amount is decreased and the solid base amount is increased compared to comparative samples SK(1, 0) and SK(0, 0) in which the $SiO_2$ addition ratio Xs is the same as SK(1, 7) and SK(0, 7). The solid acid amount of the evaluation sample SK(1, 7) is reduced to a level equal to or lower than the solid acid amount of the comparative sample SK(0, 0) in which the $SiO_2$ addition ratio Xs and the BaO addition ratio Xb are 0 mass %.

According to FIG. 13, it was confirmed that when the $SiO_2$ addition ratio Xs is within a range of 0 mass % to 5 mass %, the solid acid amount monotonously decreased as the BaO addition ratio Xb increased from 0 mass % to 14 mass % with keeping the same $SiO_2$ addition ratio Xs. It was also confirmed that when the BaO addition ratio Xb is within a range of 0 mass % to 14 mass %, the solid acid amount monotonously increased as the $SiO_2$ addition ratio Xs increased from 0 mass % to 5 mass % with keeping the same BaO addition ratio Xb.

Furthermore, it is understood from FIG. 13 that the solid acid amount of the present alumina is less than the solid acid amount of the comparative sample SK(3, 0) corresponding to the reference porous alumina when the $SiO_2$ addition ratio Xs is 3 mass % or less and the BaO addition ratio Xb is 14 mass % or less, and coking resistance is improved in comparison with the reference porous alumina.

[2.5] Summary of Evaluation Results:

According to FIGS. 8 and 12, it was confirmed that the evaluation sample SK(1, 7) has the specific surface area after each heat treatment of "1200° C.-5 hours" and "1200° C.-30 hours" improved in comparison with the comparative sample SK(3, 0) corresponding to the reference porous alumina, and the solid acid amount is reduced, and it was confirmed that the mixed addition of silica and barium oxide is effective in both the heat resistance improvement and the coking resistance improvement.

Furthermore, it was understood from FIGS. 11 and 13 that when the $SiO_2$ addition ratio Xs is within a range of 3 mass % or less and the BaO addition ratio Xb is within a range of 14 mass % or less, the specific surface area of the present alumina after heat treatment of "1200° C.-30 hours" is equal to or larger than the specific surface area of the comparative sample SK(3, 0) (the reference specific surface area), and the effective range of the $SiO_2$ addition ratio Xs and the BaO addition ratio Xb in which the solid acid amount of the present alumina is equal to or less than the solid acid amount of the comparative sample SK(3, 0) widely exists, and it was confirmed that the mixed addition of silica and barium oxide within this effective range is effective in both the heat resistance improvement and the coking resistance improvement. The effective range is the first effective range of the $SiO_2$ addition ratio Xs and the BaO addition ratio Xb in which the specific surface area of the alumina after heat treatment of "1200° C.-30 hours" is equal to or larger than the reference specific surface area.

Further, as is clear from FIG. 11, by reducing the ranges of the $SiO_2$ addition ratio Xs and the BaO addition ratio Xb to 1 mass %≤Xs≤3 mass %, 3 mass %≤Xb≤10 mass %, the specific surface area of the present alumina after the heat treatment of "1200° C.-30 hours" is further increased, and heat resistance can be further improved while maintaining the coking resistance.

[3] Evaluation of Heat Resistance and Coking Resistance of the Present Alumina Prepared by the First Type of Impregnation Method:

[3.1] Preparation of Evaluation Samples and Comparative Samples:

Each treatment in the above Steps #I11 and #I12 was performed to obtain the evaluation samples of the present alumina by using the C20 manufactured by Nippon Light Metal as the existing porous alumina, and by using TEOS solution and barium nitrate aqueous solution in amounts corresponding to the desired $SiO_2$ addition ratio and BaO addition ratio as an alkoxysilane solution and an aqueous solution of a barium compound.

As comparative samples, three kinds of comparative samples in which only the $SiO_2$ addition ratio was 0 mass %, only the BaO addition ratio was 0 mass %, and both the $SiO_2$ addition ratio and the BaO addition ratio were 0 mass % were also prepared. In the above-mentioned Step #I11, the impregnating treatment was performed without using TEOS solution for the comparative samples in which the $SiO_2$ addition ratio is 0 mass %, and without using the barium nitrate aqueous solution for the comparative samples in which the BaO addition ratio is 0 mass %. The evaluation samples and the comparative samples are denoted by the symbol SI(Xs, Xb). Xs represents the $SiO_2$ addition ratio (mass %), and Xb represents the BaO addition ratio (mass %).

[3.2] Evaluation Results of Heat Resistance:

FIG. 14 shows the measurement results of the specific surface area after heat treatment of "1200° C.-30 hours" with respect to the evaluation samples and comparative samples prepared by the first type of impregnation method. The number of evaluation samples is 20 and the number of comparative samples is 3, and the ranges of the $SiO_2$ addition ratio and the BaO addition ratio are 0≤Xs≤3 and 0≤Xb≤14.

It is understood from FIG. 14 that when the $SiO_2$ addition ratio Xs is within a range of 0.7 mass % or more and 3 mass % or less and the BaO addition ratio Xb is within a range of 1 mass % or more and 14 mass % or less, the second effective range of the $SiO_2$ addition ratio Xs and the BaO addition ratio Xb, in which the specific surface area after heat treatment of "1200° C.-30 hours" is equal to or larger than the specific surface area of the comparative sample SI(3, 0) corresponding to the reference porous alumina (corresponding to the reference specific surface area), widely exist (the second effective range: a region surrounded by a thick line in FIG. 14). The second effective range is consistent with the first effective range for the evaluation sample prepared by the kneading method shown in FIG. 11. Further, when the BaO addition ratio Xb increases from 1 mass % with the same $SiO_2$ addition ratio Xs, the specific surface area reaches a local maximum value exceeding the reference specific surface area, and thereafter, decreases to the reference specific surface area or less, and the range of the BaO addition ratio Xb at which the specific surface area is equal to or more than the reference specific surface area becomes wider as the $SiO_2$ addition ratio Xs increases. These observations are consistent with the measurement results shown in FIG. 11.

Therefore, the descriptions about heat resistance for the evaluation samples prepared by the kneading method shown in FIG. 11 are valid even for the evaluation samples prepared by the first type of impregnation method shown in FIG. 14.

Figure 15:
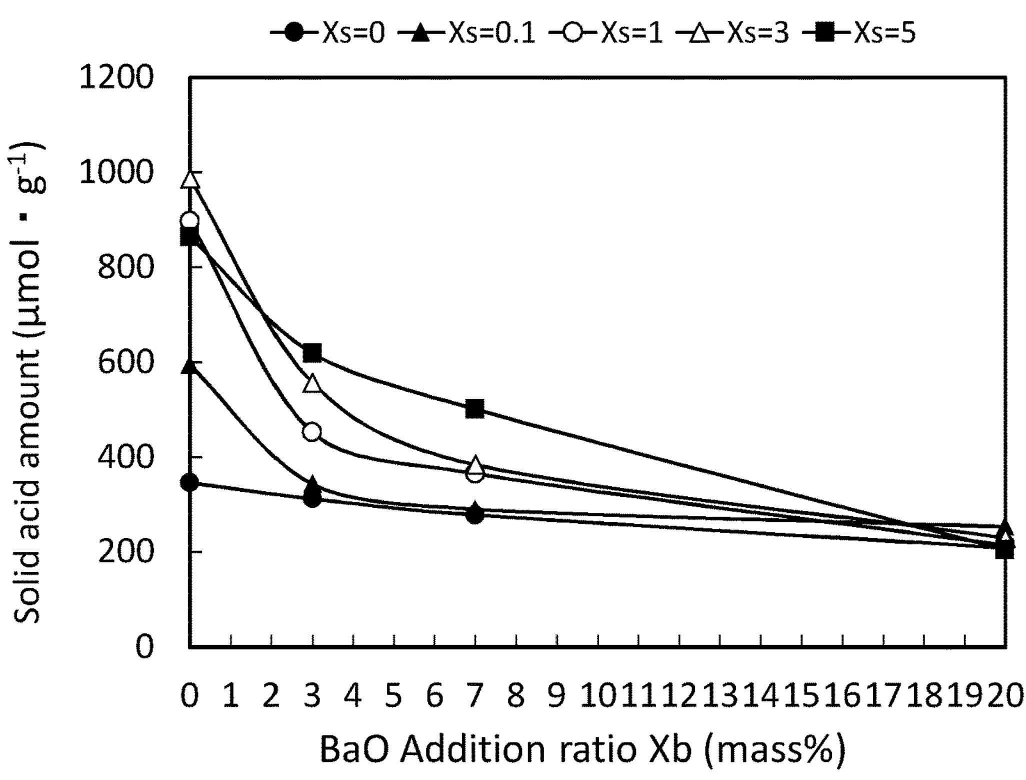
FIG. 15 is a graph showing the results of measuring the solid acid amounts of a plurality of evaluation samples and a comparative sample, each of which differs in the $SiO_2$ addition ratio and the BaO addition ratio, prepared by the first type impregnation method.

[3.3] Evaluation Results of Coking Resistance:

FIG. 15 shows the measurement results of the solid acid amount of the evaluation samples and the comparative samples prepared by the first type of impregnation method. The number of evaluation samples is 12 and the number of comparative samples is 8, and the ranges of the $SiO_2$ addition ratio and the BaO addition ratio are 0≤Xs≤5 and 0≤Xb≤20.

According to FIG. 15, it was confirmed that when the $SiO_2$ addition ratio Xs is within a range of 0 mass % to 5 mass %, the solid acid amount monotonously decreased from the solid acid amount of the comparative sample in which the BaO addition ratio Xb was 0 mass % as the BaO addition ratio Xb increased from 0 mass % to 20 mass % at the same $SiO_2$ addition ratio Xs. Thus, the point that the solid acid amount decreases monotonically with increasing the BaO addition ratio Xb is consistent with the case of the evaluation samples prepared by the kneading method shown in FIG. 13.

Further, it is understood from FIG. 15 that when the $SiO_2$ addition ratio Xs is within a range of 3 mass % or less and the BaO addition ratio Xb is within a range of 14 mass % or less, in the present alumina prepared by the first type of impregnation method, the solid acid amount is less than the solid acid amount of the comparative sample SI(3, 0) corresponding to the reference porous alumina as well as the evaluation samples prepared by the kneading method shown in FIG. 13, and that coking resistance is improved against the reference porous alumina.

[3.4] Summary of Evaluation Results:

From FIGS. 14 and 15, it is understood that, similarly to the evaluation samples prepared by the kneading method shown in FIGS. 11 and 13, in the present alumina prepared by the first type of impregnating method, when the $SiO_2$ addition ratio Xs is within a range of 3 mass % or less and the BaO addition ratio Xb is within a range of 14 mass % or less, the specific surface area of the present alumina after heat treatment of "1200° C.-30 hours" is not less than the specific surface area of the comparative sample SI(3, 0)

(reference specific surface area), and the effective ranges of the $SiO_2$ addition ratio Xs and the BaO addition ratio Xb in which the solid acid amount of the present alumina is not more than the solid acid amount of the comparative sample SI(3, 0) widely exist. As a result, it was confirmed that the mixed addition of silica and barium oxide within the effective range is effective for both the heat resistance improvement and the coking resistance improvement. The effective range is the second effective range of the $SiO_2$ addition ratio Xs and the BaO addition ratio Xb in which the specific surface area of the present alumina after heat treatment of "1200° C.-30 hours" is equal to or larger than the reference specific surface area.

As described above, regardless of the preparation method, in the same effective range of the $SiO_2$ addition ratio Xs and the BaO addition ratio Xb (same as the first effective range and the second effective range), both the heat resistance improvement and the coking resistance improvement can be achieved by the mixed addition of silica and barium oxide. This is due to the fact that the components contained in the sample calcined at 1000° C. are the same regardless of whether the preparation method is the kneading method or the impregnation method. Then, when the sample is calcined for a long time at 1200° C., the solid phase reactions of silica and alumina, barium oxide and alumina begin. As described above, in the addition of barium alone, the α-transformation of γ-alumina is faster than the formation of barium hexaaluminate, which is a key to suppressing the sintering, and the specific surface area is reduced by the high-temperature heat treatment. Also, the addition of silica can retard the α-transformation to some extent in the initial stage of the sintering, but the α-transformation cannot be prevented for prolonged calcination at 1200° C. On the other hand, it is considered that, by the mixed addition of silica and barium oxide, silica retards the initial α-transformation, and subsequently, the formation of α-alumina is suppressed by the formation of barium hexaaluminate, so that the specific surface area can be kept high. These trends can be explained from FIGS. 8, 9 and 10.

[4] Other Embodiments of the Method for Preparing the Present Alumina:

In the above embodiments, the kneading method and the first and second types of impregnating methods have been described as the method for preparing the present alumina, but the method for preparing the present alumina is not limited to a particular method as long as the method is capable of accurately controlling the $SiO_2$ addition ratio and the BaO addition ratio. As another method for preparing the present alumina, a preparation method by a precipitation method, a sol-gel method, or the like is assumed. Hereinafter, the preparation method by a precipitation method will be briefly described.

Figure 16:
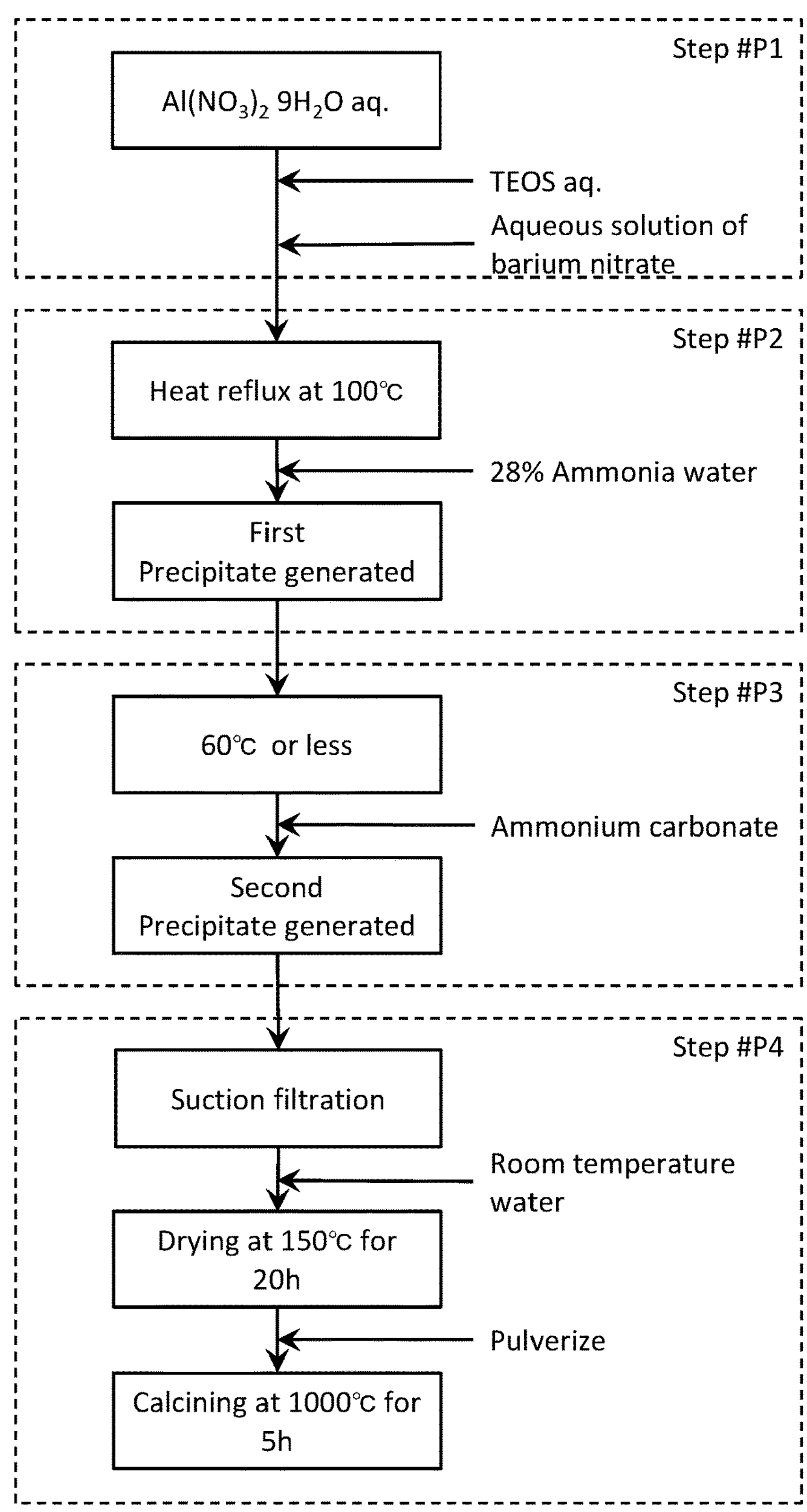
FIG. 16 is a process transition diagram showing an outline of a method for preparing the porous alumina according to the present invention by a precipitation method.

[4.1] Preparation of the Present Alumina by Precipitation Method:

As shown in FIG. 16, the method for preparing the present alumina by the precipitation method roughly comprises a step for preparing a mixed solution in which an aluminum compound, an alkoxysilane, and a barium compound are dissolved in a mixed solvent by mixing an alkoxysilane solution which contains an alkoxysilane, a mixed solvent including water and alcohol, and an inorganic acid, and an aqueous solution of a barium compound, with an aluminum solution which contains an aluminum compound and water (Step #P1), a step for forming a first precipitate by coprecipitating aluminum hydroxide and a silicon compound in the mixed solvent (Step #P2), a step for forming a second precipitate by once cooling the solution containing the precipitate to 60° C. or less and then adding ammonium carbonate to precipitate barium as carbonate (Step #P3), a step for forming the porous alumina containing aluminum oxide, silica and barium oxide (the present alumina) by filtering and washing the precipitate containing the barium compound by suction filtration, and drying and calcining the filtered and washed precipitate (Step #P4).

The alkoxysilane solution, the aluminum solution, and the aqueous solution of the barium compound used in Step #P1 are the same as the alkoxysilane solution and the aluminum solution used in Step #K1 of the kneading method described above, and the aqueous solution of the barium compound used in Step #K3 of the kneading method, and a duplicate description thereof will be omitted. Incidentally, in FIG. 16, TEOS solution and the barium nitrate aqueous solution are exemplified as the alkoxysilane solution and the aqueous solution of the barium compound, respectively. Step #P2 is basically the same as Step #K2 of the kneading method described above, and a duplicate description thereof will be omitted. However, in Step #P2, since the barium compound does not coprecipitate with aluminum hydroxide and a silicon compound as barium hydroxide, Step #P3 is required.

Ammonium carbonate decomposes into carbon dioxide gas and ammonia and water at 60° C. or higher. Therefore, in Step #P3, the solution containing the precipitate is cooled to 60° C. or less in order to avoid the above decomposition.

[5] Modifications of the Present Alumina:

The present alumina is porous alumina prepared by, for example, a kneading method, an impregnation method, a precipitation method, or the like described above, with two kinds of oxides, silica and barium oxide, mixed and added to alumina so that the $SiO_2$ addition ratio and the BaO addition ratio fall within the effective range described above. Therefore, the $SiO_2$ addition ratio and the BaO addition ratio are averagely within the above-mentioned effective ranges with respect to the total amount of the present alumina prepared.

However, in the case that heterologous porous alumina, which is porous alumina in which the $SiO_2$ addition ratio and the BaO addition ratio fall outside the effective range described above (alumina alone, porous alumina in which only silica is added to alumina, porous alumina in which only barium oxide is added to alumina, porous alumina in which silica and barium oxide are added to alumina, porous alumina in which an oxide other than silica and barium oxide is added to alumina, and the like), is mixed with the present alumina, and is partially or locally present, even if the $SiO_2$ addition ratio and the BaO addition ratio fall outside the effective range described above with respect to the total amount of the present alumina and the heterologous porous alumina, when the present alumina is present separately from the heterologous porous alumina and has the desired characteristics (specific surface area after heat treatment of "1200° C.-30 hours", solid acid amount), the portion existing as the present alumina can naturally exert the desired effect of providing porous alumina having excellent heat resistance and coking resistance. Thus, as one implementation of the present alumina, the present alumina may take the form in which the heterologous porous alumina described above exists partially or locally.

Further, as long as the $SiO_2$ addition ratio and the BaO addition ratio are within the effective range described above and the present alumina has the desired characteristics (specific surface area after heat treatment of "1200° C.-30 hours", solid acid amount), components (oxide, etc.) other than silica and barium oxide may be added to the alumina in a small amount in comparison with silica and barium oxide.

[6] Example of Application of the Present Alumina:

Since the present alumina has excellent heat resistance as described above, it is useful as a catalyst support, a filter, or the like which supports a catalytic active component. Further, since the present alumina is excellent in coking resistance in addition to excellent heat resistance as described above, it is suitable as a catalyst support to be used in a reaction using a hydrocarbon such as a steam reforming reaction.

INDUSTRIAL APPLICABILITY

The present invention is suitably used for porous alumina in which silica and barium oxide are added to aluminum oxide, and a catalyst in which the porous alumina is used as a support.

The invention claimed is:

1. Porous alumina including silica ($SiO_2$) and barium oxide (BaO) added to aluminum oxide ($Al_2O_3$), wherein the barium oxide exists either as barium monoaluminate ($BaO\cdot Al_2O_3$) or as barium monoaluminate ($BaO\cdot Al_2O_3$) and barium hexaaluminate ($BaO\cdot 6Al_2O_3$), wherein a ratio of an $SiO_2$ addition amount to a total mass of the aluminum oxide and the $SiO_2$ addition amount is defined as an $SiO_2$ addition ratio (mass %), wherein a ratio of an BaO addition amount to a total mass of the aluminum oxide and the $SiO_2$ addition amount is defined as an BaO addition ratio (mass %), wherein the $SiO_2$ addition amount is an amount obtained by converting a content of silicon (Si) in the porous alumina into a content of $SiO_2$, wherein the BaO addition amount is an amount obtained by converting a content of barium (Ba) in the porous alumina into a content of BaO, wherein the $SiO_2$ addition ratio is within a range of 3 mass % or less and the BaO addition ratio is within a range of 14 mass % or less, and wherein the silica and the barium oxide are respectively added to the aluminum oxide so that a specific surface area of the porous alumina measured by a predetermined measuring method after heat treatment at 1200° C. for 30 hours is equal to or larger than a reference specific surface area of reference porous alumina for comparison in which the $SiO_2$ addition ratio is set to 3 mass % and the BaO addition ratio is set to 0 mass % with respect to the porous alumina.

2. The porous alumina according to claim 1, wherein the $SiO_2$ addition ratio is within a range of 0.7 mass % or more and 3 mass % or less, and the silica and the barium oxide are added respectively to the aluminum oxide so that the specific surface area of the porous alumina is equal to or larger than the reference specific surface area.

3. The porous alumina according to claim 1, wherein the BaO addition ratio is within a range of 0.5 mass % or more and 14 mass % or less, and the silica and the barium oxide are added respectively to the aluminum oxide so that the specific surface area of the porous alumina is equal to or larger than the reference specific surface area.

4. The porous alumina according to claim 1, wherein provided that the $SiO_2$ addition ratio is Xs (mass %) and the BaO addition ratio is Xb (mass %), 0.7 mass %≤Xs<1 mass %, and 5 mass %≤Xb≤10 mass %, or 1 mass %≤Xs<2 mass %, and 3 mass %≤Xb≤10 mass %, or 2 mass %≤Xs≤3 mass %, and 1 mass %≤Xb≤14 mass %.

5. Porous alumina including silica ($SiO_2$) and barium oxide (BaO) added to aluminum oxide ($Al_2O_3$), wherein the barium oxide exists either as barium monoaluminate ($BaO\cdot Al_2O_3$) or as barium monoaluminate ($BaO\cdot Al_2O_3$) and barium hexaaluminate ($BaO\cdot 6Al_2O_3$), wherein an $SiO_2$ addition ratio (mass %) is defined by a ratio of an $SiO_2$ addition amount to a total mass of the aluminum oxide and the $SiO_2$ addition amount and the $SiO_2$ addition ratio (mass %) is Xs (mass %), provided that the $SiO_2$ addition amount is an amount obtained by converting a content of silicon (Si) in the porous alumina into a content of $SiO_2$, wherein a BaO addition ratio (mass %) is defined by a ratio of an BaO addition amount to a total mass of the aluminum oxide and the $SiO_2$ addition amount, and the BaO addition ratio (mass %) is Xb (mass %), provided that the BaO addition amount is an amount obtained by converting a content of barium (Ba) in the porous alumina into a content of BaO, and wherein:

0.7 mass %≤Xs<1 mass %, and 5 mass %≤Xb≤10 mass %, or 1 mass %≤Xs<2 mass %, and 3 mass %≤Xb≤10 mass %, or 2 mass %≤Xs≤3 mass %, and 1 mass %≤Xb≤14 mass %.

6. The porous alumina according to claim 4, wherein 1 mass %≤Xs≤3 mass %, and 3 mass % [≤]≤Xb [≤]≤10 mass %.

7. A catalyst comprising:

porous alumina according to claim 1, and a catalytic substance supported on the porous alumina.

8. The porous alumina according to claim 5, wherein 1 mass %≤Xs≤3 mass %, and 3 mass %≤Xb≤10 mass %.

9. A catalyst comprising:

porous alumina according to claim 5, and a catalytic substance supported on the porous alumina.

10. The porous alumina according to claim 1, wherein the barium oxide added to the aluminum oxide is formed on the surface area of the porous alumina is a cubical crystal (fcc) and has a same structure as γ-alumina, thereby suppressing α-transformation inside alumina particles of the porous alumina and improving heat resistance of the porous alumina.

* * * * *